(12) United States Patent
Loheide et al.

(10) Patent No.: US 11,743,538 B2
(45) Date of Patent: Aug. 29, 2023

(54) DISPARATE LIVE MEDIA OUTPUT STREAM PLAYOUT AND BROADCAST DISTRIBUTION

(71) Applicant: Turner Broadcasting System, Inc., Atlanta, GA (US)

(72) Inventors: Donald Jude Loheide, Mableton, GA (US); Gregory Mcclain Stigall, Douglasville, GA (US); Nishith Kumar Sinha, Mableton, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 17/708,241

(22) Filed: Mar. 30, 2022

(65) Prior Publication Data

US 2022/0224981 A1 Jul. 14, 2022

Related U.S. Application Data

(63) Continuation of application No. 17/094,102, filed on Nov. 10, 2020, now Pat. No. 11,438,659, which is a
(Continued)

(51) Int. Cl.
*H04N 21/458* (2011.01)
*H04N 21/45* (2011.01)
(Continued)

(52) U.S. Cl.
CPC ....... *H04N 21/458* (2013.01); *H04N 21/4356* (2013.01); *H04N 21/44204* (2013.01);
(Continued)

(58) Field of Classification Search
None
See application file for complete search history.

(56) References Cited

U.S. PATENT DOCUMENTS 6,701,355 B1 3/2004 Brandt et al.
8,099,757 B2 1/2012 Riedl et al.
(Continued)

FOREIGN PATENT DOCUMENTS

KR 101061952 B1 9/2011

OTHER PUBLICATIONS

Corrected Notice of Allowance for U.S. Appl. No. 15/396,468 dated Aug. 26, 2022.
(Continued)

*Primary Examiner* — William J Kim
(74) *Attorney, Agent, or Firm* — Chip Law Group

(57) ABSTRACT

A stream playout and distribution system is provided for disparate live media output stream playout and broadcast distribution. The system generates a new version of a disparate live media output stream manifest based on insertion of a plurality of segments of at least one of a pre-encoded media asset or a live input stream into the disparate live media output stream manifest. Each segment of the plurality of segments corresponds to a different quality level and a different content encryption mode. The plurality of segments corresponds to broadcast content segments encoded in a first encoding format of the new version of the disparate live media output stream manifest. The system converts the broadcast content segments encoded in the first encoding format to a second encoding format in accordance with a broadcasting protocol.

19 Claims, 5 Drawing Sheets

Related U.S. Application Data continuation of application No. 16/230,268, filed on Dec. 21, 2018, now Pat. No. 10,880,606.

(51) Int. Cl.
*H04N 21/643* (2011.01)
*H04N 21/81* (2011.01)
*H04N 21/435* (2011.01)
*H04N 21/442* (2011.01)

(52) U.S. Cl.
CPC ..... *H04N 21/4524* (2013.01); *H04N 21/4532* (2013.01); *H04N 21/64322* (2013.01); *H04N 21/812* (2013.01); *H04N 21/8146* (2013.01)

(56) References Cited

U.S. PATENT DOCUMENTS

| | | |
|---|---|---|
| 8,132,203 B2 | 3/2012 | Heer |
| 8,458,053 B1 | 6/2013 | Buron et al. |
| 8,600,382 B2 | 12/2013 | Hicks, III |
| 8,842,879 B2 | 9/2014 | Laksono et al. |
| 8,954,521 B1 | 2/2015 | Faaborg et al. |
| 9,380,264 B1 | 6/2016 | Vakalapudi |
| 10,045,091 B1 | 8/2018 | Nijim et al. |
| 10,924,804 B2 | 2/2021 | Loheide et al. |
| 11,109,102 B2 | 8/2021 | Loheide et al. |
| 2002/0112239 A1 | 8/2002 | Goldman |
| 2004/0031056 A1 | 2/2004 | Wolff |
| 2004/0163103 A1 | 8/2004 | Swix et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2006/0064730 A1 | 3/2006 | Rael et al. |
| 2006/0122916 A1 | 6/2006 | Kassan |
| 2006/0287915 A1 | 12/2006 | Boulet et al. |
| 2007/0101361 A1 | 5/2007 | Spielman et al. |
| 2009/0070808 A1 | 3/2009 | Jacobs |
| 2009/0187939 A1 | 7/2009 | LaJoie |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0010899 A1 | 1/2010 | Lambert et al. |
| 2010/0125880 A1 | 5/2010 | Roewe |
| 2010/0287297 A1 | 11/2010 | Lefebvre |
| 2010/0293585 A1 | 11/2010 | Xia |
| 2011/0052144 A1 | 3/2011 | Abbas et al. |
| 2011/0123062 A1 | 5/2011 | Hilu |
| 2011/0177775 A1 | 7/2011 | Gupta et al. |
| 2011/0209181 A1 | 8/2011 | Gupta et al. |
| 2011/0238754 A1 | 9/2011 | Dasilva et al. |
| 2011/0246202 A1 | 10/2011 | McMillan et al. |
| 2011/0302601 A1 | 12/2011 | Mayo et al. |
| 2012/0030011 A1 | 2/2012 | Rey et al. |
| 2012/0271942 A1 | 10/2012 | Walker et al. |
| 2012/0272278 A1 | 10/2012 | Bedi |
| 2012/0304223 A1 | 11/2012 | Sargent et al. |
| 2013/0085851 A1 | 4/2013 | Pedro et al. |
| 2013/0205212 A1 | 8/2013 | Sinha et al. |
| 2013/0263182 A1 | 10/2013 | Ivy et al. |
| 2013/0276023 A1 | 10/2013 | Kent et al. |
| 2014/0013354 A1 | 1/2014 | Johnson et al. |
| 2014/0020017 A1 | 1/2014 | Stern et al. |
| 2014/0071818 A1 | 3/2014 | Wang et al. |
| 2014/0152894 A1 | 6/2014 | Childs et al. |
| 2014/0189514 A1 | 7/2014 | Hilliard |
| 2014/0270338 A1 | 9/2014 | Zhao et al. |
| 2015/0106856 A1 | 4/2015 | Rankine |
| 2015/0237386 A1 | 8/2015 | Sheehan et al. |
| 2015/0256861 A1 | 9/2015 | Oyman |
| 2015/0271234 A1 | 9/2015 | O'Malley et al. |
| 2015/0289022 A1 | 10/2015 | Gross |
| 2015/0381936 A1 | 12/2015 | Goyal et al. |
| 2015/0382042 A1 | 12/2015 | Wagenaar et al. |
| 2016/0077710 A1 | 3/2016 | Lewis et al. |
| 2016/0127788 A1 | 5/2016 | Roberts et al. |
| 2016/0165306 A1 | 6/2016 | Nam |
| 2016/0308958 A1 | 10/2016 | Navali et al. |
| 2016/0345074 A1 | 11/2016 | Serbest et al. |
| 2017/0055012 A1 | 2/2017 | Phillips et al. |
| 2017/0055041 A1 | 2/2017 | Zhu |
| 2017/0070789 A1 | 3/2017 | Liassides et al. |
| 2017/0099506 A1 | 4/2017 | Grover |
| 2017/0099511 A1 | 4/2017 | Grover |
| 2017/0118537 A1 | 4/2017 | Stransky-Heilkron et al. |
| 2017/0118538 A1 | 4/2017 | Ashbacher |
| 2017/0195718 A1 | 7/2017 | Nair et al. |
| 2017/0289597 A1 | 10/2017 | Riedel et al. |
| 2018/0007060 A1 | 1/2018 | Leblang et al. |
| 2018/0165650 A1 | 6/2018 | Kashyape et al. |
| 2018/0184047 A1 | 6/2018 | Simonsen et al. |
| 2018/0285747 A1 | 10/2018 | Bron et al. |
| 2018/0367823 A1 | 12/2018 | Brinkley et al. |
| 2019/0068665 A1 | 2/2019 | Kieft et al. |
| 2019/0364317 A1 | 11/2019 | Milford |
| 2019/0380021 A1 | 12/2019 | Meek et al. |
| 2020/0244778 A1 | 7/2020 | Berookhim et al. |
| 2021/0297740 A1 | 9/2021 | Loheide et al. |

OTHER PUBLICATIONS

Corrected Notice of Allowance for U.S. Appl. No. 16/895,439 dated Sep. 14, 2022.
Corrected Notice of Allowance for U.S. Appl. No. 16/902,893 dated Sep. 19, 2022.
Corrected Notice of Allowance for U.S. Appl. No. 17/017,052 dated Aug. 1, 2022.
Corrected Notice of Allowance for U.S. Appl. No. 17/017,145 dated Jul. 22, 2022.
Corrected Notice of Allowance for U.S. Appl. No. 17/017,145 dated Sep. 15, 2022.
Corrected Notice of Allowance for U.S. Appl. No. 17/017,241 dated Aug. 3, 2022.
Corrected Notice of Allowance for U.S. Appl. No. 17/094,102 dated Aug. 3, 2022.
Corrected Notice of Allowance for U.S. Appl. No. 17/094,319 dated Aug. 1, 2022.
Corrected Notice of Allowance for U.S. Appl. No. 17/094,319 dated Sep. 23, 2022.
Corrected Notice of Allowance for U.S. Appl. No. 17/147,887 dated Jul. 22, 2022.
Corrected Notice of Allowance for U.S. Appl. No. 17/340,166 dated Aug. 22, 2022.
Corrected Notice of Allowance for U.S. Appl. No. 17/340,166 dated Jul. 5, 2022.
Corrected Notice of Allowance for U.S. Appl. No. 17/340,166 dated Sep. 23, 2022.
Final Office Action for U.S. Appl. No. 16/854,970 dated Aug. 18, 2022.
Final Office Action for U.S. Appl. No. 17/206,473 dated Sep. 8, 2022.
Non-Final Office Action for U.S. Appl. No. 17/326,281 dated Aug. 18, 2022.
Non-Final Office Action for U.S. Appl. No. 17/016,789 dated Sep. 22, 2022.
Non-Final Office Action for U.S. Appl. No. 17/340,538 dated Oct. 3, 2022.
Non-Final Office Action for U.S. Appl. No. 17/408,680 dated Sep. 15, 2022.
Non-Final Office Action for U.S. Appl. No. 17/453,628 dated Sep. 27, 2022.
Notice of Allowability for U.S. Appl. No. 16/895,439 dated Jul. 20, 2022.
Notice of Allowability for U.S. Appl. No. 16/902,893 dated Jul. 20, 2022.
Notice of Allowance for U.S. Appl. No. 17/017,241 dated Jul. 15, 2022.
Notice of Allowance for U.S. Appl. No. 17/306,758 dated Sep. 16, 2022.

(56) References Cited

OTHER PUBLICATIONS

Notice of Allowance for U.S. Appl. No. 17/340,677 dated Aug. 8, 2022.
Notice of Allowance for U.S. Appl. No. 17/527,817 dated Oct. 3, 2022.
Notice of Allowance for U.S. Appl. No. 17/688,666 dated Sep. 20, 2022.
Notice of Allowance for U.S. Appl. No. 17/858,698 dated Oct. 4, 2022.
Corrected Notice of Allowance for U.S. Appl. No. 15/396,468 dated Apr. 1, 2022.
Corrected Notice of Allowance for U.S. Appl. No. 15/396,468 dated Jun. 24, 2022.
Corrected Notice of Allowance for U.S. Appl. No. 16/985,444 dated Apr. 20, 2022.
Corrected Notice of Allowance for U.S. Appl. No. 16/985,444 dated Jun. 1, 2022.
Corrected Notice of Allowance for U.S. Appl. No. 17/016,789 dated Jun. 27, 2022.
Corrected Notice of Allowance for U.S. Appl. No. 17/016,789 dated May 18, 2022.
Corrected Notice of Allowance for U.S. Appl. No. 17/017,052 dated Jun. 15, 2022.
Corrected Notice of Allowance for U.S. Appl. No. 17/017,145 dated Jun. 2, 2022.
Corrected Notice of Allowance for U.S. Appl. No. 17/017,145 dated May 17, 2022.
Corrected Notice of Allowance for U.S. Appl. No. 17/038,323 dated Apr. 19, 2022.
Corrected Notice of Allowance for U.S. Appl. No. 17/038,323 dated May 26, 2022.
Corrected Notice of Allowance for U.S. Appl. No. 17/094,102 dated Apr. 20, 2022.
Corrected Notice of Allowance for U.S. Appl. No. 17/094,102 dated Jun. 24, 2022.
Corrected Notice of Allowance for U.S. Appl. No. 17/094,102 dated May 17, 2022.
Corrected Notice of Allowance for U.S. Appl. No. 17/094,319 dated Jun. 15, 2022.
Corrected Notice of Allowance for U.S. Appl. No. 17/094,319 dated May 17, 2022.
Corrected Notice of Allowance for U.S. Appl. No. 17/147,887 dated May 18, 2022.
Corrected Notice of Allowance for U.S. Appl. No. 17/326,258 dated Apr. 19, 2022.
Corrected Notice of Allowance for U.S. Appl. No. 17/340,166 dated Jun. 2, 2022.
Final Office Action for U.S. Appl. No. 17/017,241 dated Apr. 28, 2022.
Non-Final Office Action for U.S. Appl. No. 17/206,473 dated Jun. 22, 2022.
Non-Final Office Action for U.S. Appl. No. 16/918,085 dated Mar. 31, 2022.
Non-Final Office Action for U.S. Appl. No. 17/206,737 dated Jun. 23, 2022.
Non-Final Office Action for U.S. Appl. No. 17/527,817 dated Jun. 15, 2022.
Notice of Allowability for U.S. Appl. No. 16/092,893 dated Jun. 8, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated May 13, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/326,258 dated Apr. 27, 2022.
Corrected Notice of Allowance for U.S. Appl. No. 15/396,468 dated Oct. 17, 2022.
Corrected Notice of Allowance for U.S. Appl. No. 16/854,970 dated Jan. 5, 2023.
Corrected Notice of Allowance for U.S. Appl. No. 17/017,241 dated Dec. 2, 2022.
Corrected Notice of Allowance for U.S. Appl. No. 17/017,241 dated Oct. 20, 2022.
Corrected Notice of Allowance for U.S. Appl. No. 17/147,887 dated Oct. 11, 2022.
Corrected Notice of Allowance for U.S. Appl. No. 17/306,758 dated Dec. 21, 2022.
Corrected Notice of Allowance for U.S. Appl. No. 17/306,758 dated Jan. 5, 2023.
Corrected Notice of Allowance for U.S. Appl. No. 17/326,281 dated Dec. 22, 2022.
Corrected Notice of Allowance for U.S. Appl. No. 17/340,256 dated Jan. 6, 2023.
Corrected Notice of Allowance for U.S. Appl. No. 17/340,677 dated Dec. 9, 2022.
Corrected Notice of Allowance for U.S. Appl. No. 17/340,677 dated Nov. 14, 2022.
Corrected Notice of Allowance for U.S. Appl. No. 17/340,677 dated Oct. 21, 2022.
Corrected Notice of Allowance for U.S. Appl. No. 17/688,666 dated Dec. 14, 2022.
Corrected Notice of Allowance for U.S. Appl. No. 17/688,666 dated Dec. 28, 2022.
Corrected Notice of Allowance for U.S. Appl. No. 17/839,882 dated Dec. 23, 2022.
Corrected Notice of Allowance for U.S. Appl. No. 17/858,698 dated Dec. 28, 2022.
Final Office Action for U.S. Appl. No. 16/918,085 dated Oct. 24, 2022.
Final Office Action for U.S. Appl. No. 17/206,737 dated Jan. 5, 2023.
Non-Final Office Action for U.S. Appl. No. 15/988,572 dated Oct. 6, 2022.
Non-Final Office Action for U.S. Appl. No. 17/206,473 dated Dec. 22, 2022.
Non-Final Office Action for U.S. Appl. No. 17/366,738 dated Dec. 9, 2022.
Non-Final Office Action for U.S. Appl. No. 17/830,587 dated Nov. 25, 2022.
Notice of Allowance for U.S. Appl. No. 16/854,970 dated Oct. 13, 2022.
Notice of Allowance for U.S. Appl. No. 17/326,281 dated Dec. 7, 2022.
Notice of Allowance for U.S. Appl. No. 17/830,788 dated Dec. 9, 2022.
Notice of Allowance for U.S. Appl. No. 17/839,649 dated Oct. 19, 2022.
Notice of Allowance for U.S. Appl. No. 17/839,882 dated Oct. 26, 2022.
Supplemental Notice of Allowance for U.S. Appl. No. 17/527,817 dated Jan. 5, 2023.
Advisory Action for U.S. Appl. No. 17/408,680 dated Mar. 28, 2023.
Advisory Action for U.S. Appl. No. 17/408,739 dated Mar. 28, 2023.
Final Office Action for U.S. Appl. No. 15/988,572 dated Apr. 11, 2023.
Final Office Action for U.S. Appl. No. 17/408,680 dated Jan. 12, 2023.
Final Office Action for U.S. Appl. No. 17/408,739 dated Jan. 12, 2023.
Non-Final Office Action for U.S. Appl. No. 17/739,885 dated Mar. 30, 2023.
Non-Final Office Action for U.S. Appl. No. 17/742,468 dated Mar. 30, 2023.

(56) References Cited

OTHER PUBLICATIONS

Notice of Allowance for U.S. Appl. No. 17/731,049 dated Mar. 2, 2023.
Notice of Allowance for U.S. Appl. No. 16/918,085 dated Jan. 13, 2023.
Notice of Allowance for U.S. Appl. No. 17/206,473 dated Mar. 30, 2023.
Notice of Allowance for U.S. Appl. No. 17/340,538 dated Jan. 23, 2023.
Notice of Allowance for U.S. Appl. No. 17/453,628 dated Mar. 2, 2023.
Notice of Allowance for U.S. Appl. No. 17/830,587 dated Mar. 9, 2023.
Notice of Allowance for U.S. Appl. No. 17/986,403 dated Apr. 7, 2023.
Non-Final Office Action for U.S. Appl. No. 17/206,737 dated Jun. 8, 2023.
Non-Final Office Action for U.S. Appl. No. 17/734,704 dated Jun. 21, 2023.
Non-Final Office Action for U.S. Appl. No. 18/149,332 dated Apr. 27, 2023.
Notice of Allowance for U.S. Appl. No. 18/158,202 dated May 25, 2023.
Notice of Allowance for U.S. Appl. No. 18/160,833 dated Jun. 14, 2023.
Notice of Allowance for U.S. Appl. No. 17/408,739 dated Jul. 5, 2023.

DISPARATE LIVE MEDIA OUTPUT STREAM PLAYOUT AND BROADCAST DISTRIBUTION

CROSS-REFERENCE TO RELATED APPLICATIONS/INCORPORATION BY REFERENCE

This Patent Application is a Continuation Application of U.S. patent application Ser. No. 17/094,102, filed on Nov. 10, 2020, which is further a Continuation Application of U.S. Pat. No. 10,880,606, issued on Dec. 29, 2020.

This application makes reference to:
U.S. Pat. No. 11,051,074, issued on Jun. 29, 2021;
U.S. Pat. No. 11,051,061, issued on Jun. 29, 2021;
U.S. Pat. No. 10,992,973, issued on Apr. 27, 2021;
U.S. Pat. No. 10,924,804, issued on Feb. 16, 2021; and
U.S. Pat. No. 10,856,016, issued on Dec. 1, 2020.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for disparate live media output stream playout and broadcast distribution.

BACKGROUND

The past decade has witnessed a massive expansion of live web simulcast services in the field of advertisement-based broadcasting and cable networking systems. Broadcasting platforms usually refer to types of networks that are used to deliver media content to viewers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

Modern web streaming protocols, such as HTTP Live Streaming (HLS) and Dynamic Adaptive Streaming over HTTP (DASH), are implemented to support streaming of live content services, such as DIRECTV NOW℠, SLING TV℠ and PLAYSTAYION™ VUE, to consumer devices. Traditional service providers, such as COMCAST℠, also have set-top boxes capable of receiving both legacy broadcast distribution protocols, as well as modern web streaming protocols. However, such traditional service providers are constrained by the number of broadcast channels they can support on the legacy infrastructure and are more likely to allow more niche-based programming using Internet-based distribution.

Technically, such modern web streaming protocols break media content into numerous small broadcast content segments, typically less than 10 seconds in length. Modern web streaming protocols further implement a manifest that corresponds to a dataset that may instructs a media player what broadcast content segments to retrieve and play next.

The modern web streaming protocols further support pre-encoded media assets, such as video-on-demand (VOD) assets, and a live input streams, such as live media content, as well. The VOD assets prepared for web distribution may have a sequence of short duration video segments as well as a pre-encoded media asset manifest. The sequence may include separate physical files or pointers (real or to be calculated) to the short broadcast content segments inside a larger file. The pre-encoded media asset manifest may specify all the video segments that make up the full length of the pre-encoded media asset. Alternatively, the pre-encoded media asset manifest may include instructions for the media player to be able to determine all the video segments of the pre-encoded media asset.

On the other hand, in case of live input streams, new short live broadcast content segments may be made available as soon as they are created. In some protocols, each new short media content segment is added to a live input stream manifest while in others the media player is provided necessary information to determine the next live media content segment. In the latter case, an inband signal in the live media content segment is used to inform the media player to re-inspect the live input stream manifest for a change in the live media content segment.

The pre-encoded media asset manifest, the live input stream manifest, and/or the broadcast content segments (in the pre-encoded media asset and/or the live input stream) may also include and/or specify additional information to facilitate the media player to transition smoothly between media content streams from different sources. The manifest may be used for creating a playlist of multiple media content files, or for interrupting media content stream with advertising and then resuming the media content stream.

Typically, in the broadcast industry, a live channel consists of media content that is pre-produced. A broadcast air chain may include expensive infrastructure to create an "Air Master" file, decode and play the "Air Master" file from a server, overlay channel branding graphics, and then encode it for broadcast distribution. The distribution of the live channel typically takes place over satellite. As the Internet is rapidly changing how video is delivered, several new Internet protocols are being developed to replace the need for expensive transport such as satellite transport. Such solutions are gaining popularity for channels with a limited number of receive locations, but the solutions do not address the high cost of the channel production itself or delivery to numerous receive locations. In other words, such solutions are expensive and lend to single channels covering respective wide geographic areas. Such solutions also fail to recognize that existing delivery protocols, such as HLS and DASH, are sufficient, in many cases, to produce and deliver channels at scale over a traditional content delivery network for a much lower cost.

Given the trends toward media content distribution using internet protocols, there is required a system to eliminate the need for a high cost broadcast infrastructure to generate and distribute live channels using existing pre-encoded media assets prepared or live input streams for distribution by leveraging an understanding of modern web streaming protocols and the latest techniques used in satellite distribution. Thus, an advanced system may be required that provides the network provider with the capability to not only generate and distribute new channel offerings in cost-effective manner, but also provide enhanced viewer experience to increase their appeal in order to gain a wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for disparate live media output stream playout and broadcast distribution, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for disparate live media output stream playout and broadcast distribution. Various embodiments of the disclosure provide a method and system that simplifies live channel creation, and provides a network provider with the capability to not only provide live channel offerings in cost-effective manner but also provide enhanced viewer experience to increase their appeal in order to gain wider audience.

In accordance with an embodiment of the disclosure, a system is provided for disparate live media output stream playout and broadcast distribution. The system may include one or more first processors and one or more second processors. The one or more first processors may be configured to receive and encode broadcast content in accordance with one or more streaming protocols to generate a plurality of encoded broadcast content segments. The one or more processors may be further configured to generate a broadcast content schedule based on a plurality of broadcast content parameters associated with the received broadcast content and an analysis of a broadcast schedule associated with one or more broadcast channels. The one or more processors may be further configured to generate a playout schedule by inserting a schedule for non-programming content in the broadcast schedule, and then generate a plurality of disparate live media output streams and a plurality of disparate live media output stream manifests based on the playout schedule and content viewing demographics. Each of the plurality of disparate live media output stream manifests comprises an index of a plurality of pre-encoded media assets, a plurality of live input streams, and/or the plurality of encoded broadcast content segments. The one or more second processors in a receiving system may be configured to receive at least one disparate live media output stream manifest of the plurality of disparate live media output stream manifests. The one or more second processors may be further configured to retrieve one or more broadcast content segments encoded in a first encoding format based on the at least one disparate live media output stream manifest. The one or more second processors may be further configured to convert the one or more retrieved broadcast content segments to a second encoding format. The second encoding format may be in accordance with one or more broadcasting protocols.

Figure 1:
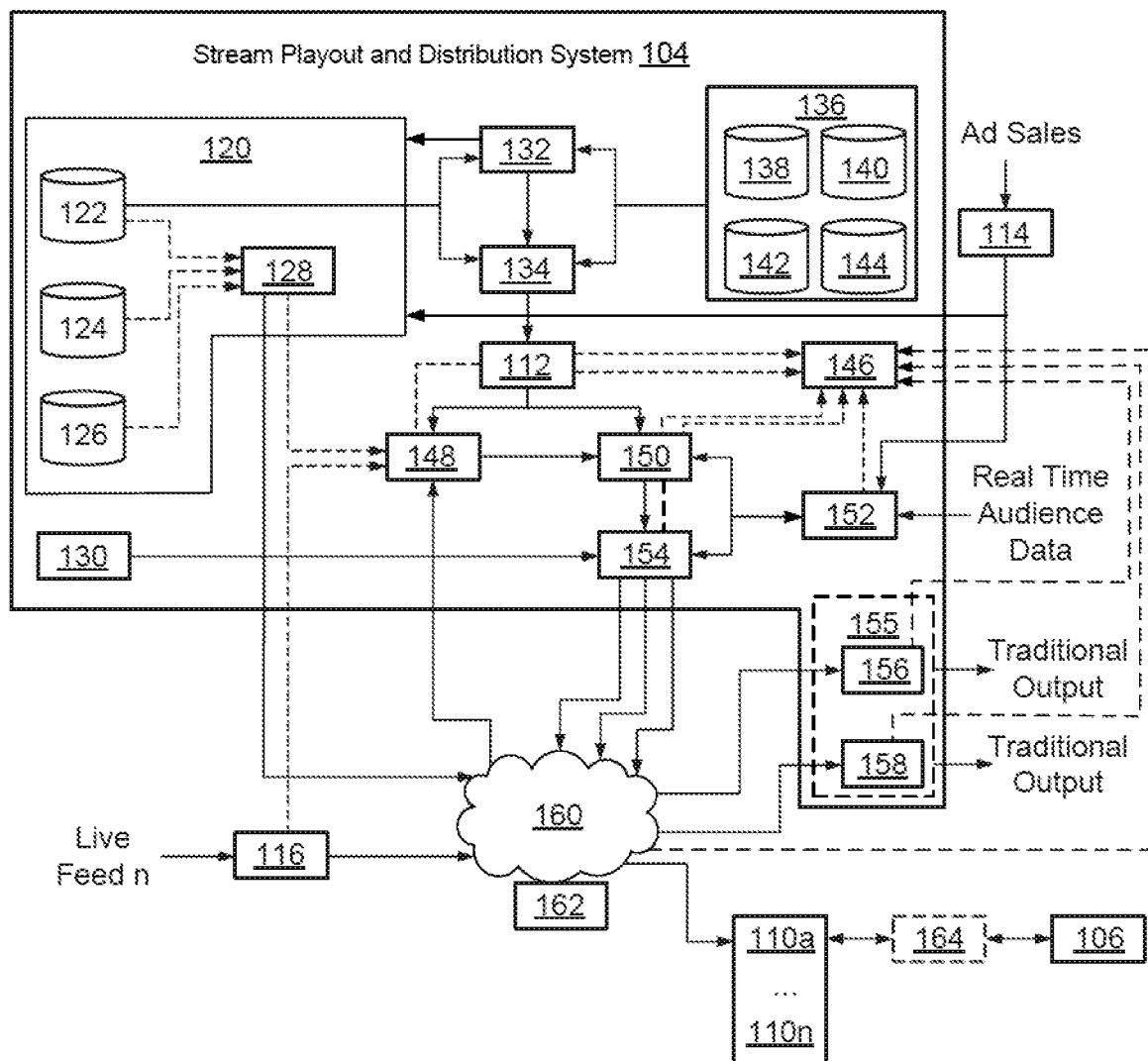
FIG. 1 is a block diagram that illustrates an exemplary stream playout and distribution system for disparate live media output stream playout and broadcast distribution, in accordance with an exemplary embodiment of the disclosure.

FIG. 1 is a block diagram that illustrates an exemplary stream playout and distribution system for disparate live media output stream playout and broadcast distribution, in accordance with an exemplary embodiment of the disclosure. Referring to FIG. 1, the stream playout and distribution system 104 in a media packaging and distribution system 102 may comprise a content processing system 120 including a media content metadata storage system 122, a media content master storage system 124, an ad/promo content master storage system 126, and a content encoder/packager 128. The stream playout and distribution system 104 may further include a switch logic manager 130, a broadcast network scheduler 132, a traffic system 134, and a schedule planning database 136 that includes a content rights storage 138, a historical performance storage 140, a competitive analysis storage 142, and a channel preference storage 144. The stream playout and distribution system 104 may further include a system monitoring unit 146, an indexing and storage system 148, a stream publishing engine 150, a real-time linear ad server 152, a stream versioning engine 154, the IP receiving system 155 comprising a first IP receiver 156 and a second IP receiver 158, a content delivery system 160, a media storage unit 162, and a proxy server 164. There is further shown consumer devices 110a, . . . , 110n and an Ad decisioning server 106 communicably coupled to the stream playout and distribution system 104 via the content delivery system 160.

In some embodiments of the disclosure, the content processing system 120, the switch logic manager 130, the broadcast network scheduler 132, the traffic system 134, the schedule planning database 136, the system monitoring unit 146, the indexing and storage system 148, the stream publishing engine 150, the real-time linear ad server 152, the stream versioning engine 154, the first IP receiver 156, and the second IP receiver 158 may be integrated to form an integrated system. In some embodiments of the disclosure, the content processing system 120, the switch logic manager 130, the broadcast network scheduler 132, the traffic system 134, the schedule planning database 136, the system monitoring unit 146, the indexing and storage system 148, the stream publishing engine 150, the real-time linear ad server 152, the stream versioning engine 154, the first IP receiver 156, and the second IP receiver 158 may be distinct. Other separation and/or combination of the various entities of the exemplary stream playout and distribution system 104 illustrated in FIG. 1 may be done without departing from the spirit and scope of the various embodiments of the disclosure.

The media packaging and distribution system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, and/or embedded or externally referenced metadata, a combination of multiple-audio, multiple-video, and/or embedded or externally referenced metadata. Accordingly, the media packaging and distribution system 102 provides disparate live media output stream playout and broadcast distribution.

In this regard, the media packaging and distribution system 102 may provide video programming services to viewers, usually for a subscription fee (such as pay television). The media packaging and distribution system 102 also handles distribution, for example, multicasting, unicasting, broadcasting, streaming, for one or more channels to be viewed on one or more of the plurality of consumer devices 110a, . . . , 110n.

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In this regard, the broadcast provider may be configured to execute code that communicates linear video feeds (also referred to as a network television feed or broadcast feed) to the media packaging and distribution system 102. In a broadcast chain, the broadcast provider may receive actual content, for example, from a production studio, in a serial digital interface (SDI) video interface and/or on a high-definition SDI (HD-SDI) video interface, process the content, such as insertion of graphics, closed captions, preparation of programming schedule, insertion of triggers, and the like, and final delivery by a broadcasting apparatus. The communicated linear video feed and the playout schedule may correspond to a channel, such as CNN channel that is provided to the media packaging and distribution system 102, via a network. The linear video feed may be provided as a multi-program transport stream (MPTS). In an embodiment, the live stream encoder/packager 116 may be configured to convert the MPTS to web distribution protocols prior to feeding to the media packaging and distribution system 102, via a network. The broadcast provider may be owned by (or associated to) a broadcast provider or operator, a network provider or operator, or a content provider or operator.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain events or operations, such as, for example, when to blackout shows. The media packaging and distribution system 102 may benefit various entities, for example direct-broadcast satellite (DBS) providers, cable television (CATV) systems, and other wireline video providers and competitive local exchange carriers (CLECs) using, for example, IPTV.

The stream playout and distribution system 104 may comprise suitable logic, circuitry, and interfaces that may be configured to execute a code that may be configured to generate a plurality of disparate live media output stream manifests by manipulating manifests of pre-encoded media assets or pre-encoded live input streams. In accordance with an embodiment, the plurality of disparate live media output stream manifests may be generated for consumer devices 110a, . . . , 110n based on respective ability to support one-to-one targeted insertion of non-programming content, such as ads. In accordance with another embodiment, the plurality of disparate live media output stream manifests may be generated for media players, such as IP receivers, based on respective geographic locations. The stream playout and distribution system 104 may be configured to encrypt and protect (by means of digital rights management) the plurality of disparate live media output stream manifests before distribution to such media players.

The Ad decisioning server 106 may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of the live input streams based on the detected upcoming indicator, such as an inbound trigger, a signaling point, and/or a signal in a pre-encoded media asset and/or a live input stream by the Ad decisioning server 106. The Ad decisioning server 106 may receive a request for retrieval of non-programming content, for example, ads, from a non-programming content proxy server (not shown). Specifically, the Ad decisioning server 106 may receive the request from one or more of the plurality of consumer devices 110a, . . . , 110n, via the non-programming content proxy server (not shown). The request may be received when one or more indicators and/or pre-encoded place holder content segment for a scheduled duration of one or more non-programming content breaks. The scheduled durations of one or more non-programming content breaks may be defined by a received programming schedule, and are encountered in the disparate live media output stream manifest during media content playout by media players at the one or more of the plurality of consumer devices 110a, . . . , 110n.

Thus, for requests received from the plurality of consumer devices 110a, . . . , 110n, based on corresponding disparate live media output stream manifests, the Ad decisioning server 106 may identify the opportunities for the real-time content or advertisement placement activity. In this regard, as the advertisement decisioning component of the Ad decisioning server 106 is implemented in a consumer device, such as one or more of the plurality of consumer devices 110a, . . . , 110n, the Ad decisioning server 106 may identify real-time content or advertisement placement opportunity for dynamic ad insertion. For example, commercial or non-commercial advertisements may be dynamically inserted within program segments of a media feed by the Ad decisioning server 106 based on the indicator detected by the media player or the non-programming content proxy server. The detected indicator may be, for example upcoming inbound trigger, signaling point, and/or signal, in the disparate live media output stream manifest. In various embodiments, the advertisement decisioning component of the Ad decisioning server 106 may be configured to determine which advertisements, graphical treatment graphics and presentation information to serve to the consumer devices 110a, . . . , 110n based on stream ID, a program ID, a geographical location, time, and any preferences associated with an individual consumer or an advertisement ID specified by the disparate live media output stream manifest.

The consumer devices 110a, . . . , 110n may refer to end-user devices or consumption devices where the content is played for consumption by a user. The number of impressions of a media item, such as an advertisement and/or promotional media, on such plurality of consumer devices 110a, . . . , 110n determines the advertising impact or promotion impact and number of actual audiences achieved during campaigns. Examples of the consumer devices 110a, . . . , 110n may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The consumer devices 110a, . . . , 110n may further include process/system that may process the output for any means, regardless of the capability or intent to decode for media presentation, and on which the consumer may launch a web page, a web application, or a web service to view media content.

The ad/promo campaign manager 114 may comprise suitable logic, circuitry, and interfaces that may be configured to execute code that may be configured to receive non-programming content, such as ad and/or promotional content campaigns, from ad sales. Such ad campaigns may be sold including, for example, audience targets, creatives, length of campaign, separation rules, and the like. The ad/promo campaign manager 114 may further receive windows for the campaigns along with desired audience demographics and segments, and ad versions. The ad/promo campaign manager 114 may be configured to inform the stream playout and distribution system 104 when new ads or promos are entered in to the ad/promo campaign manager 114 by the ad sales.

The live stream encoder/packager 116 may comprise suitable logic, circuitry, and interfaces that may be configured to execute a code that may be configured to encode and package the live feeds or live source streams to generate live input streams. The live stream encoder/packager 116 may be further configured to generate a plurality of live input stream manifests corresponding to the each of the live input streams. Various media container formats of the live input streams may include, but are not limited to, transport stream (TS), fragmented MP4 (fMP4), Common Media Application Format (CMAF) and the like. Various formats of the plurality of live input stream manifests or playlists, may include, but are not limited to DASH and HLS. The generated live input streams and manifests may be used for distribution, such as Internet distribution. The generated live input streams and manifests may be further published to various the IP receiving system 155.

The content processing system 120 may comprise suitable logic, circuitry, and interfaces that may be configured to store, encode and package pre-encoded media assets and corresponding manifests. The content processing system 120 may comprise master versions of media content, corresponding metadata, and master versions of non-programming content, such as ads and promotional content. Various media container formats of the pre-encoded media assets may include, but are not limited to, TS, fMP4, CMAF, and the like. Various formats of the plurality of pre-encoded media asset manifests or playlists, may include, but are not limited to DASH and HLS.

The media content metadata storage system 122 may comprise suitable logic, circuitry, and interfaces that may be configured to store media content metadata. The media content metadata may include metadata associated with broadcast content segments stored in the media content master storage system 124. Examples of the media content metadata may include a media content identifier, a title of the media content, type of the media content (such as movie series (season episode number)), genre, plot summary, duration, advertisement break locations, credit locations, scene descriptions, a short summary of the broadcast content segments, a short summary of ideal advertisement placements within the broadcast content segments, a file format, digital right management (DRM), encryption information, length of the media content, a date and/or time the media content was added to the catalog of media content master storage system 124, a new item indicator for the media content (e.g., a new media asset that became available within the last 24 hours, last few days, last week, and/or the like), and a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the media content metadata storage system 122 may also store program-specific information (PSI) data as defined by ISO/IEC 13818-1 (MPEG-2), closed captioning data, and subtitles associated with the broadcast content segments stored in the media content master storage system 124. Other forms of metadata may be utilized without departing from the spirit and scope of the various embodiments of the disclosure.

The media content master storage system 124 may comprise suitable logic, circuitry, and interfaces that may be configured to store master versions of the media content. The master versions may be used as the source for creating the on-demand or pre-encoded media assets for the IP receiving system 155 and the consumer devices 110a, . . . , 110n in the required formats. In an embodiment, various media container formats of the media content may include, but are not limited, TS, fMP4, CMAF, and the like.

The ad/promo content master storage system 126 may comprise suitable logic, circuitry, and interfaces that may be configured to store master versions of non-programming content, such as ads and promotional content. The master versions of non-programming content may be used as a source for creating on-demand or pre-encoded media assets for the IP receiving system 155 and the consumer devices 110*a*, . . . , 110*n* in the required formats.

The content encoder/packager 128 may comprise suitable logic, circuitry, and interfaces that may be configured to execute code to generate a package that includes media content and associated metadata. The content encoder/packager 128 may receive media content from the media content master storage system 124, corresponding metadata from the media content metadata storage system 122 and the non-programming content from the ad/promo content master storage system 126 to generate the package. Thus, the content encoder/packager 128 encodes and packages the media content into the required on-demand formats for delivery to the IP receiving system 155 and the consumer device 110*a*. The broadcast content may correspond to one or more of the plurality of broadcast content segments transcoded to different types of streams for different types of devices, such as a TV or a mobile device, and marked with Nielson markers. Based on such a package, the stream playout and distribution system 104 may dynamically generate one or more encoded media assets for playout to one or more media players communicatively coupled through the content delivery system 160. In accordance with an embodiment, the content encoder/packager 128 may be directly coupled to the indexing and storage system 148. In accordance with an embodiment, the content encoder/packager 128 may be directly coupled to the content delivery system 160.

The content encoder/packager 128 may be configured to publish the one or more encoded media assets in real-time or near real-time. The content encoder/packager 128 may be operable to create "C3" content assets and clips that may be made available before media content rolls out of the stream playout and distribution system 104. The content encoder/packager 128 may also be configured to provide near-real-time redundancy. The resulting converted output, i.e. one or more encoded media assets, that are generated by the content encoder/packager 128 may be communicated to the indexing and storage system 148 which may be communicatively coupled with the IP receiving system 155 and the consumer devices 110*a*, . . . , 110*n*. The content encoder/packager 128 may also support a robust interface (e.g. application data interface (ADI)) that defines the on-demand duration of the individual broadcast content segments as well as encryption requirements and a service type to link for ad insertion.

For encoding and the packaging, the content encoder/packager 128 may be configured to mark locations of the one or more non-programming content breaks and condition the media content such that the locations of the one or more non-programming content breaks are adjacent to boundaries of the plurality of broadcast content segments. Based on the media content metadata, in case the one or more indicators are not included in the pre-encoded media asset at packaging time, the content encoder/packager 128 may be configured to insert the one or more indicators to mark the credits and overlay graphics locations in the media content.

Once the content encoder/packager 128 has encoded and packaged the media content based on the associated metadata corresponding to the media content assets for media distribution, the content encoder/packager 128 may be further configured to generate corresponding media content manifests. The media content manifests may correspond to data sets, such as text-based instruction sets, that may be utilized by the IP receiving system 155 and the consumer devices 110*a*, . . . , 110*n* to determine which broadcast content segments to play and storage locations of such broadcast content segments. In accordance with an embodiment, the content encoder/packager 128 may be further configured to add in-band indicators in the media content assets. The in-band indicators may indicate markers corresponding to location of the one or more non-programming content breaks, credits, and overlay graphic locations for one or more protocols that may be utilized to determine next media content asset to be downloaded.

The switch logic manager 130 may comprise suitable logic, circuitry, and interfaces that may be configured to execute code to determine required number of disparate live media output streams. Accordingly, the switch logic manager 130 may be configured to generate a programming schedule, such as the playout schedule 112, for each disparate live media output stream based the original stream schedules and alternate content schedules. The switch logic manager 130 may generate the programming schedule based on, for example, localizations or audience segments, content rights and preferences, ad preferences, and requirements of stream owner/operator. The stream owner operator may provide one or more additional parameters to the switch logic manager 130 regarding contractual content requirements for specific locations, and historical knowledge of location preferences. The stream owner/operator may specify data about how to handle non-programming content breaks, whether to insert non-programming content between media switches, how the transition between events may be executed, whether a network logo needs to be displayed and if so how often. The stream owner/operator may further provide data, such as consumer data (for example, billing Zip code), and special service level tiers. Additionally, the stream owner/operator may provide content parameters, for example, regarding the types of channels to be generated (theme, genre, title, and the like), the number of advertisement breaks per hour, and duration of such advertisement breaks.

The programming schedule, such as the playout schedule 112, may correspond to a data set for playout of an existing first disparate live media output stream for a live channel. The programming schedule may inform the stream publishing engine 150 about pre-encoded media assets and/or live input streams as well as when and how to switch between the various pre-encoded media assets and live input streams. The programming schedule may also support defining timing for network logos, insertion of promotional graphics break durations for mid roll ads, break locations, and durations in the pre-encoded media asset and live input stream switches. In accordance with an embodiment, in case the real-time linear ad server 152 is not in use, the programming schedule may include the specific ads to be played during each break, treating such ads like other on-demand media content assets. In accordance with another embodiment, in case the real-time linear ad server 152 is in use, the programming schedule may include breaks that may be marked and filled at playout based on decisions received from the real-time linear ad server 152.

The broadcast network scheduler 132 may comprise suitable logic, circuitry, and interfaces that may be configured to execute code to generate the programming schedule, such as the playout schedule 112, which indicates programming content, such as pre-encoded media assets and/or live input streams, and when such programming content may be played out. The broadcast network scheduler 132 may be configured to generate the programming schedule based on inputs received from the media content metadata storage system 122 and the schedule planning database 136. The broadcast network scheduler 132 may be configured to schedule the programming content based on, for example, desired channel theme, content metadata, content rights, and competitive analysis of what competing programming content is available on other channels.

The traffic system 134 may comprise suitable logic, circuitry, and interfaces that may be configured to execute code to receive a list of programming content to be played along with the program indicators, such as program start, from the broadcast network scheduler 132. The traffic system 134 may further determine break durations and locations based on media content conditioning and an amount of time to be filled to hit the start time of the next program in the list of programming content. The traffic system 134 may further determine what non-programming content, such as ads, to place based on data, such as historical performance and competitive analysis, received from the schedule planning database 136. The traffic system 134 may further insert network rules for schedules, such as overlay graphic schedules, and the like.

In accordance with an embodiment, the traffic system 134 may check from the media content metadata storage system 122 about media content duration and break schedule. Subsequently, the traffic system 134 may be configured to determine the duration for each ad break to have the program end at the correct scheduled time and have the new program start at the correct schedule time.

In accordance with an embodiment, the traffic system 134 may be communicatively coupled with the ad/promo campaign manager 114 to determine what ads and promos are available to be scheduled. The traffic system 134 may be configured to schedule all the advertisements to provide the highest yield based on historical performance. In an embodiment, the traffic system 134 may be configured to schedule a portion of the advertisements to play and then allow other advertisements to be specified by the real-time linear ad server 152. The traffic system 134 may be configured to allow the real-time linear ad server 152 to specify all advertisements to be played. The traffic system 134 may mark the entire ad break for downstream replacement on the consumer device 110a that is capable of individual ad targeting. The traffic system 134 may mark individual ads for downstream replacement if the ads are targeted to specific audience demographics or segments, or specific geo locations.

The schedule planning database 136 may comprise suitable logic, circuitry, and interfaces that may be configured to execute code to store information that may be used by the broadcast network scheduler 132 to generate the programming schedule on a channel. Such programming schedule results in maximized size and value of audience to advertisers. Such information may also be used to schedule non-programming content that may provide the highest revenue for the channel. In accordance with an embodiment, the information may define channel preferences including when and where to display logos and other graphics.

The content rights storage 138 may store a set of rules governing when and how media content may be used. For example, when the media content may be made available on-demand, if the media content may be made available over the Internet, whether the media content may be used in a disparate live media output stream and the timeframe, or is the user allowed to restart the media content when live streamed. The historical performance storage 140 may store a set of rules governing historical performance of users on the media content. The competitive analysis storage 142 may store a set of rules governing competitive analysis of various providers. For example, direct-broadcast satellite (DBS) providers, cable television (CATV) systems, and other wireline video providers and competitive local exchange carriers (CLECs) using IPTV. The channel preferences storage 144 may store previous media content selections by users for both live input streams and pre-encoded media assets that may be used to personalize and organize the channel preferences in future.

The system monitoring unit 146 may comprise suitable logic, circuitry, and interfaces that may be configured to execute code to monitor the output of the IP receiving system 155, such as the first IP receiver 156 and the second IP receiver 158, with respect to the playout schedule 112, disparate live media output stream manifests generated by the stream publishing engine 150, and the output of the real-time linear ad server 152. The system monitoring unit 146 may generate a data log of one or more inconsistencies between the outputs of the IP receiving system 155, the stream publishing engine 150, and the real-time linear ad server 152. The system monitoring unit 146 may also monitor the health of various systems and engines, such as the stream publishing engine 150, the indexing and storage system 148, and the real-time linear ad server 152. The system monitoring unit 146 may be a high-level monitoring system to meet broadcast 99.9995 reliability goal.

The indexing and storage system 148 may comprise suitable logic, circuitry, and interfaces that may be configured to execute code to receive the encoded media assets and manifests from the content encoder/packager 128 and live input streams and manifests from the live stream encoder/packager 116. Accordingly, the indexing and storage system 148 may perform indexing on the received encoded media assets and manifests and/or live input streams and manifests. For indexing, the indexing and storage system 148 may ingest the manifests associated with the encoded media assets and/or (continuously ingest the manifests associated with) live input streams, store data log of a plurality of indicators indicating non-programing content breaks, program start, program end, and graphic overlays included in the media assets, and validating completion of the indexing of the encoded media assets and/or live input streams. The indexing and storage system 148 may further index tags indicators, such as tag marking, program indicators, such as program boundaries, and non-program indicators, such as ad break locations, graphical treatment (such as overlay) opportunities credits, and DRM supported systems.

The stream publishing engine 150 may comprise suitable logic, circuitry, and interfaces that may be configured to execute code to insert information related to the plurality of broadcast content segments and one or more events from the pre-encoded media asset manifests and/or live input stream manifests into a disparate live media output stream manifest at defined intervals. The defined intervals may be intervals at which the insertion of the information related to the plurality of broadcast content segments and the one or more events from the pre-encoded media asset manifests and/or live input stream manifests into the disparate live media output stream manifest is performed, is not greater than duration of a previous media content segment. The disparate live media output stream manifest may correspond to a data set that includes playlists of a plurality of pre-encoded media assets and/or live input streams, information about the plurality of pre-encoded media assets and/or live input streams, one or more overlay opportunities, and duration of a set of non-programing content breaks within one on-demand media asset and/or live input streams or between at least two of the plurality of pre-encoded media assets and/or live input streams.

The stream publishing engine 150 may be further configured to publish the disparate live media output stream manifest, leveraging indexes of the pre-encoded media assets and/or live input streams received from the indexing and storage system 148, based on the playout schedule 112. In accordance with an embodiment, the stream publishing engine 150 may be configured to insert one or more overlay indicators, which are independent of, for example, a pre-encoded media asset, at defined time stamps in the generated disparate live media output stream. The stream publishing engine 150 may be further configured to support a plurality of digital rights management indicators in the disparate live media output stream manifest, and may include one or more of a program start, a program end, content or context change indicator, a break indicator, an overlay indicator in the generated disparate live media output stream manifest based on one or more events in the manifest or metadata associated with, for example, the pre-encoded media asset.

The real-time linear ad server 152 may comprise suitable logic, circuitry, and interfaces that may be configured to leverage real-time audience data from sources, such as digital clients, set-top box data, smart TVs that support ACR, ATSC 3.0, or Nielson watermarks, along with traditional broadcast ad separation rules, program exclusivity rules, and the like to determine which ads will yield the highest revenue. The real-time audience data may include information on the makeup of the current viewing audience for a live channel, including demographic, income, category preferences, and the like. In accordance with an embodiment, the real-time linear ad server 152 configured to mark each advertisement for downstream replacement if the advertisements are targeted to specific audience demographics or segments, or specific geo locations. In an embodiment, the stream publishing engine 150 may be configured to insert advertisement indicators and stitch advertisements in the live stream manifest output as instructed by the programming schedule and the real-time linear ad server 152.

The stream versioning engine 154 may comprise suitable logic, circuitry, and interfaces that may be configured to generate a variant of a disparate live media output stream. The variant may be generated by publishing unique streaming manifests based on the SCTE-224 schedule versioning rules received from the switch logic manager 130. In an embodiment, a version of the disparate live media output stream may be generated with all ads inserted by the real-time linear ad server 152 marked for replacement. In an embodiment, the version of the disparate live media output stream may be generated to direct to the consumer device 110a that may individually insert targeted ads. In an embodiment, the version of the disparate live media output stream may be generated with lower value ads marked for replacement with high value ads for gambling, alcohol, or tobacco to a region where they are not restricted.

The IP receiving system 155 may correspond to a set of devices or computers that replace a traditional satellite receiver used to deliver channels to a third part distribution partner, such as a cable TV operator. The IP receiving system 155 may receive a channel over the Internet or a private network using modern web streaming protocols, such as HLS or DASH. The IP receiving system 155 may further output the channel in a format compatible with legacy delivery methods.

The IP receiving system 155 of the stream playout and distribution system 104 may receive at least one disparate live media output stream manifest from the content delivery system 160 and may retrieve one or more broadcast content segments encoded in a first encoding format of the disparate live media output stream manifest. The first encoding format may be, for example, TS, fMP4, or CMAF. The IP receiving system 155 of the stream playout and distribution system 104 may convert the one or more retrieved broadcast content segments in the first encoding format to a second encoding format. The second encoding format may be, for example, HD-SDI, analog video, or encode to MPEG2 TS. The disparate live media output stream in the second format may be delivered to the third-party distribution partner. Thus, the stream playout and distribution system 104 eliminates the cost of different playouts, such as traditional playout, broadcast encode, and web simulcast encode. The stream playout and distribution system 104 may provide a single play out platform for pre-encoded media assets, thus matches the Digital Video Broadcasting (for International) or Advanced Television Systems Committee (ATSC) 3.0 (for the United States) approach.

The first IP receiver 156 and the second IP receiver 158 may correspond to the set of devices or computers in the IP receiving system 155 that replace the traditional satellite receiver used to deliver channels to a third-party distribution partner, such as a cable TV operator. In an embodiment, the first IP receiver 156 may be a regional IP receiver, and the second IP receiver 158 may be a base IP receiver providing respective traditional outputs.

The content delivery system 160 may comprise networks configured for distributing media content to the IP receiving system 155 and the plurality of consumer devices 110a, . . . , 110n. Generally, the term "content," "metadata," "media," and similar words are used interchangeably to refer to any type of media—audio, videos, datacasts, music, text, images, graphics, articles, still photos, animated photos, moving photos, photo galleries, video galleries, infographics, maps, polls, guest biographies, tweets or other social media, blog posts, and/or the like. The content delivery system 160 may be configured to provide a plurality of disparate live media output streams to the IP receiving system 155 and the plurality of consumer devices 110a, . . . , 110n, via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The media storage unit 162 may be configured to store encoded and packaged media assets, pre-encoded media asset manifests, live input streams, and live input stream manifests for distribution.

The proxy server 164 may comprise suitable logic, circuitry, and interfaces that may be configured to execute code to communicate with the consumer devices 110a, . . . , 110n. In accordance with an embodiment, the proxy server 164 may receive requests from the consumer devices 110a, . . . , 110n when the consumer devices 110a, . . . , 110n generate requests for the Ad decisioning server 106 upon encountering, for example, an advertisement break tag or an overlay tag in the updated disparate live media output stream. In such cases, the proxy server 164 may generate requests to the Ad decisioning server 106 for the advertisements on behalf of the consumer devices 110a, . . . , 110n. In another embodiment, the proxy server 164 may receive the manifest form the content delivery system 160 and may deliver the manifest to the consumer devices 110a, . . . , 110n based on one or more consumer requests. The proxy server 164 may be configured to detect for example break indicators, and call the Ad decisioning server 106, replace the filler media segments in the manifest and then deliver the modified manifest to the consumer devices 110*a*, . . . , 110*n*. In an embodiment, the proxy server 164 may be used for one or more consumer devices of the plurality of consumer devices 110*a*, . . . , 110*n* where the media player is fully controlled by a third-party and does not support ad insertion. In such embodiment, ad blocking may be reduced which usually targets communication between the consumer devices 110*a*, . . . , 110*n* and the Ad decisioning server 106. Further, the proxy server 164 may replace the pre-encoded placeholder content segments, such as slate content segments, with the advertisement content segments received from the Ad decisioning server 106.

In operation, the broadcast network scheduler 132 may be configured to schedule programming content based on various broadcast content parameters, such as, but not limited to, desired channel theme, content metadata, content rights, and competitive analysis of what competing programming is available on other channels. In accordance with an embodiment, the programming content may correspond to one or more pre-encoded media assets and/or live input streams. The programming content may correspond to live input streams in case a live event is included in the schedule. The broadcast network scheduler 132 may finalize the broadcast content schedule of the programming content and the transmit the broadcast content schedule to the content processing system 120 and the traffic system 134.

The content processing system 120 may determine whether the programming content is available and has been processed to a correct format. In accordance with an embodiment, when the programming content is not available, the content processing system 120 may order the programming content. Accordingly, the content processing system 120 receives the programming content, assures the quality, and processes the programming content to a specific standard. The content processing system 120 may further store the processed programming content as media content asset in the media content master storage system 124. The content processing system 120 may further store the associated metadata in the media content metadata storage system 122.

The content encoder/packager 128 in the content processing system 120 may retrieve the media content asset from the media content master storage system 124. The content encoder/packager 128 may further access the media content metadata storage system 122 to determine the media content asset duration and location of non-programming content, such as ad breaks, credits, overlay opportunities, and the like.

The content encoder/packager 128 may encode and package the media content asset for one or more high quality broadcast compatible profiles to support broadcast use cases. Accordingly, the content encoder/packager 128 may mark precise ad break locations and condition the media content asset so that the ad break locations fall on boundaries of corresponding broadcast content segments. The content encoder/packager 128 may further insert, for example, tag indicators to mark the credits and potential overlay graphics locations in the media content asset.

In accordance with an embodiment, the content encoder/packager 128 may further insert in-band triggers to mark the location of the ad breaks, credits, and potential overlay graphic locations for protocols that do not constantly query the manifest for new information but instead calculate the next content to be downloaded based on a defined algorithm.

In accordance with another embodiment, the content encoder/packager 128 may include watermarks or in-band metadata to support program viewership measurements in broadcast use cases. The media content asset is thus prepared for the web distribution and hereinafter referred to as pre-encoded media asset. The pre-encoded media asset and the corresponding manifest may be stored in the media storage unit 162 of the content delivery system 160.

In accordance with an embodiment, the ad sales team may provide sold ad campaigns and internal promotional campaigns information into the ad/promo campaign manager 114. The ad sales team may further provide a window for the campaigns along with desired audience demographics and segments, and ad versions.

The traffic system 134 may access the media content metadata storage system 122 to determine media content asset duration and break schedule and generate a playout schedule 112. The traffic system 134 may further determine the duration for each ad break to have the program end at correct scheduled time and have the new program start at the correct schedule time. The traffic system 134 may further communicate with the ad/promo campaign manager 114 to determine what ads and promotional content are available to be scheduled. In accordance with another embodiment, the traffic system 134 may schedule the ads to play to provide the highest yield based on historical performance. In accordance with another embodiment, the traffic system 134 may schedule a portion of the ads to play and then allow other ads to be specified by the real-time linear ad server 152. In accordance with another embodiment, the traffic system 134 may allow the real-time linear ad server 152 to specify ads to be played.

The traffic system 134 may mark an entire ad break for a downstream replacement on a consumer device, for example the consumer device 110*a*, that may individually target an ad. The traffic system 134 may further mark individual ads for the downstream replacement if the ads are targeted to specific audience demographics or segments, or specific geographical locations. In accordance with an embodiment, the ad/promo campaign manager 114 may inform the content processing system 120 when new ads or promotional content are entered.

The content processing system 120 may further determine whether the non-programming media content, such as the ads and promotional content, is available and has been processed to a correct format. In accordance with an embodiment, when the non-programming content is not available, the content processing system 120 may order the non-programming content. Accordingly, the content processing system 120 receives the non-programming content, assures the quality, and processes the non-programming content to a specific standard. The content processing system 120 may further store the processed non-programming content in the ad/promo content master storage system 126.

The content encoder/packager 128 in the content processing system 120 may retrieve the non-programming content from the ad/promo content master storage system 126. The content encoder/packager 128 may further encode and package the non-programming content for one or more high quality broadcast compatible profiles to support broadcast use cases.

In accordance with an embodiment, the content encoder/packager 128 may further insert in-band triggers to identify the ad or promotional content and provide special instructions for tracking when it is viewed. In accordance with another embodiment, the content encoder/packager 128 may include watermarks or in-band metadata to support ad and promotional content viewership measurements in broadcast use cases. The non-programming content may be prepared for web distribution and may be stored in the media storage unit 162 of the content delivery system 160.

The traffic system 134 may leverage channel preferences to determine when and what network logo to display, when to signal for overlay promotions, and the like. The traffic system 134 may generate the playout schedule 112 and provide playout schedule 112 to the indexing and storage system 148, and the stream publishing engine 150.

The playout schedule 112 thus generated may include manifests for live input streams and/or pre-encoded media assets, and ads and promotional content, are ingested into the indexing and storage system 148. In accordance with an embodiment, a proprietary manifest format may be there between the content encoder/packager 128 and the indexing and storage system 148 when additional information carried in the published manifest is required to be passed (not traditionally).

The indexing and storage system 148 may index broadcast content segments from each manifest corresponding to the live input streams and/or pre-encoded media assets. The indexing and storage system 148 may log indicators indicating ad breaks, program start, program end, graphic overlays, and the like. The indexing and storage system 148 may further perform checks to validate that the live input streams and/or pre-encoded media assets are complete and ready for inclusion in the disparate live media output stream.

At the schedule time, the stream publishing engine 150 may generate a disparate live media output stream manifest by inserting a new segment from the scheduled pre-encoded media asset manifest or the live input stream manifest into the disparate live media output stream manifest on an interval not greater than the previous content segment duration. For certain protocols, the stream publishing engine 150 may update at media content breaks for ads or transitions to the next programming content. The stream publishing engine 150 may further ensure correct handling of transitions between the live input streams and the pre-encoded media assets based on the channel preferences.

When the stream publishing engine 150 encounters indicators marking an ad break within the pre-encoded media asset manifest, the live input stream manifest, or the playout schedule 112, the stream publishing engine 150 may insert such indicators in the disparate live media output stream manifest. The stream publishing engine 150 may further stitch in ads and promotional content included in the playout schedule 112 and/or access the real-time linear ad server 152 to fill one or more portions of the ad break, as defined by the playout schedule 112.

The real-time linear ad server 152 may leverage the real-time audience data from sources, such as digital clients, set-top box data, smart TVs that support content recognition (CR) or ATSC 3.0 watermarks, along with traditional broadcast ad separation rules, program exclusivity rules, and the like, to determine which ads may yield the highest revenue. The real-time linear ad server 152 may provide a list of ads to the stream publishing engine 150 to be played. The real-time linear ad server 152 may mark individual ads for a downstream replacement if the ads are targeted to specific audience demographics or segments, or specific geographical locations. Accordingly, the stream publishing engine 150 may insert ad indicators and stitch ads in the disparate live media output stream manifest, as instructed by the playout schedule 112 and the real-time linear ad server 152.

The stream publishing engine 150 may transmit the output to the stream versioning engine 154 to create an appropriate variant of the disparate live media output stream manifest. The stream versioning engine 154 may receive versioning instructions from the switch logic manager 130. The switch logic manager 130 may define a number of disparate live media output stream manifests based on desired ad and content localizations, as well as ad rules for audience demographic and segment targeting. Such disparate live media stream manifest may be generated for the consumer device 110a based on its ability to support one-to-one targeted ad insertion.

In accordance with an embodiment, the stream versioning engine 154 may insert or pass through ad indicators for the consumer device 110a to replace the entire ad break with individual targeted ads and may stitch in placeholder content to replace the scheduled ads based on the instructions provided from the switch logic manager 130. In accordance with another embodiment, the stream versioning engine 154 may insert or pass through ad indicators to mark individual ads for potential replacement with targeted ads based on the user's location, known demographic information (such as females over 50 years), and known audience segments (for example auto intender for a luxury vehicle). In accordance with another embodiment, the stream versioning engine 154 may stitch in alternate programming content based on defined localizations or audience segment preferences. In accordance with another embodiment, the stream versioning engine 154 may exclude the one or more high quality profiles provided to support broadcast use cases.

When indicators marking ads for potential localization are found in the disparate live media stream manifest from the stream publishing engine 150, the stream versioning engine 154 may access the real-time linear ad server 152 to determine if there are local ads that may yield higher revenue than the already inserted ads. The stream versioning engine 154 may replace the existing ads with targeted ads in each disparate live media output stream manifest based on the instructions of the real-time linear ad server 152 for each localization zone. The real-time linear ad server 152 may abide by broadcast ad pod and program separation and exclusivity rules, and the like when determining the ad localizations. The stream versioning engine 154 may stitch in alternate program content based on the defined localizations. The stream versioning engine 154 may exclude one or more profiles created for consumer distribution.

When ad indicators are found in one of the plurality of disparate live media output stream manifest from the stream versioning engine 154, the consumer device 110a access the Ad decisioning server 106 to determine the targeted ads to be inserted. In accordance with an embodiment, the consumer device 110a may access the Ad decisioning server 106 to replace the entire break, if indicators to replace the entire break are present in the disparate live media stream manifest. In accordance with an embodiment, the consumer device 110a may access the Ad decisioning server 106 to replace individual ads, if indicators to replace the entire break are not present in the disparate live media output stream manifest and indicators to replace individual ads are present. In accordance with an embodiment, the consumer device 110a may access the Ad decisioning server 106 to include parameters to aid in targeting, such as location, or IDs that may determine demographic and audience segments.

In an embodiment, there may be ads that may be specifically marked for potential replacement based on a target demographic or audience segment or location. In such case, the consumer device 110a may determine whether it is part of the target audience demographic, segment, or location and not call for replacement. The consumer device 110a may simply pass the targeted audience demographic, segment, or location in the replacement request and the Ad decisioning server 106 may determine that the consumer device 110a is part of the target audience and not return a replacement ad.

In accordance with an embodiment, the first IP receiver 156 and/or the second IP receiver 158 in the IP receiving system 155 may be provided with correct disparate live media output stream manifests based on corresponding geolocations. In accordance with an embodiment, the disparate live media output stream may be encrypted and DRM protected. In such case, the first IP receiver 156 and/or the second IP receiver 158 may be authorized to receive corresponding disparate live media output stream. The first IP receiver 156 and/or the second IP receiver 158 may download, decrypt, and decode the broadcast content segments referenced in corresponding disparate live media output stream manifest.

In accordance with an embodiment, the first IP receiver 156 and/or the second IP receiver 158 may insert graphical treatment, such as bugs and lower third graphics, and squeeze back the video in the disparate live media output stream to provide an experience that is equivalent to the broadcast experience. The first IP receiver 156 and/or the second IP receiver 158 may convert a first format of the disparate live media output stream to a second format. The second format is compatible with what is available from a modern satellite receiver. The second format may be decoded analog, digital video, or a transcoded digital stream using a compatible codec.

In accordance with various embodiments, versions of the first IP receiver 156 and/or the second IP receiver 158 may be required to support different network and end user conditions, for example reliable and bandwidth stable Internet connection, reliable Internet connection but not stable bandwidth, unreliable Internet connection, or shared Internet condition with direct deliver to the consumer device 110a.

Figure 2:
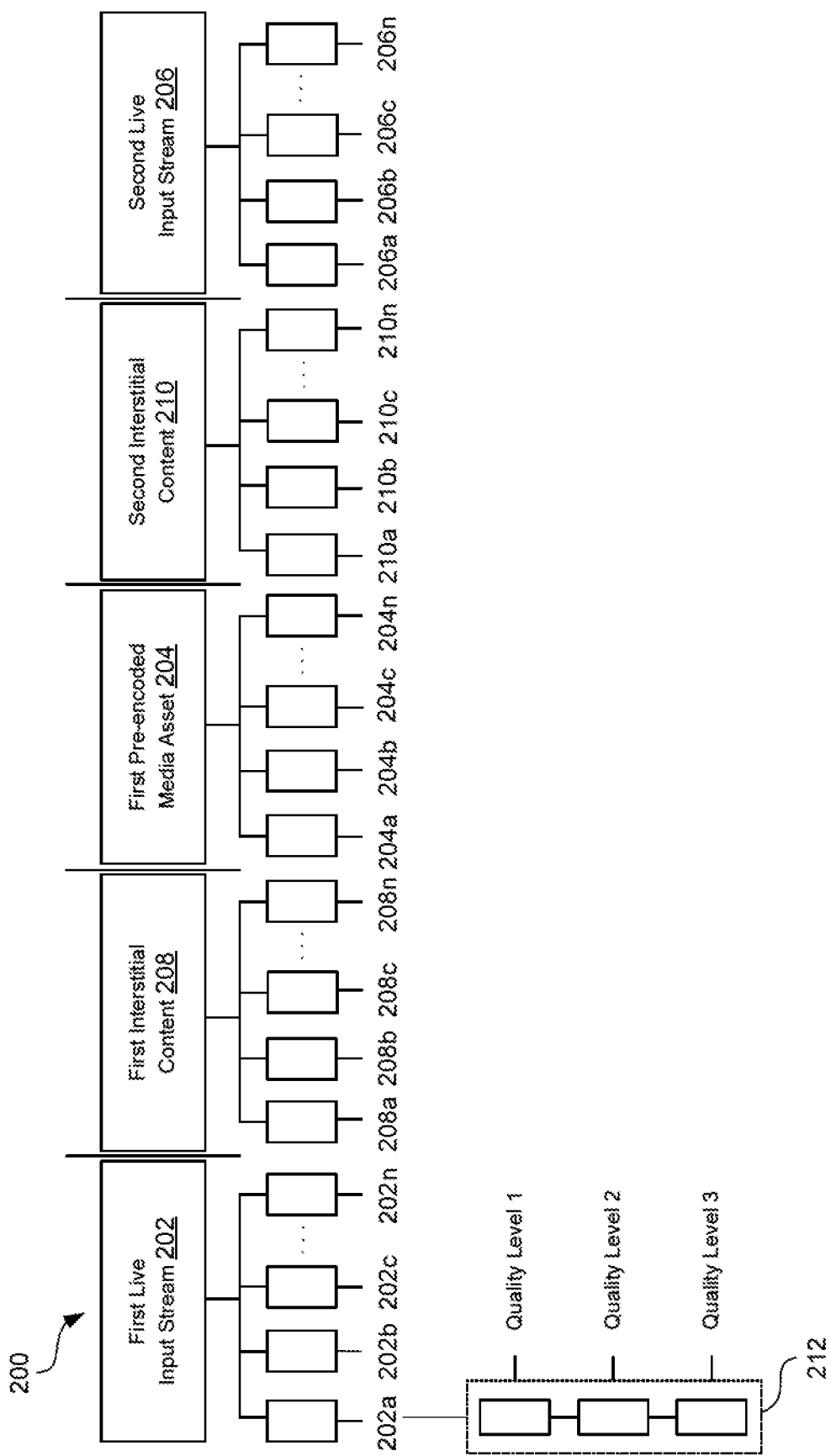
FIG. 2 illustrates segmentation of live input streams and pre-encoded media assets for a playout schedule for disparate live media output stream playout and broadcast distribution by the stream playout and distribution system of FIG. 1, in accordance with an exemplary embodiment of the disclosure.

FIG. 2 illustrates segmentation of live input streams and pre-encoded media assets for the playout schedule 112 for disparate live media output stream playout and broadcast distribution by the stream playout and distribution system 104 of FIG. 1, in accordance with an exemplary embodiment of the disclosure. Referring to the exemplary arrangement of FIG. 2, there is shown a first live input stream 202, a first pre-encoded media asset 204, and a second live input stream 206. There is also shown a targeted first interstitial content 208 placed after the first live input stream 202, and a second interstitial content 210 placed after the first pre-encoded media asset 204. The first live input stream 202 may be segmented into a first set of video segments 202a, 202b, 202c, . . . , 202n. Similarly, the first pre-encoded media asset 204 and the second live input stream 206 may also be segmented into second set of video segments 204a, 204b, 204c, . . . , 204n, and third set of video segments 206a, 206b, 206c, . . . , 206n respectively. By way of example, the segmentation may be executed by a segmenting system (not shown) during a preparation stage of the media assets. In accordance with an embodiment, the segments of the first set of video segments 202a, 202b, 202c, . . . , 202n, the second set of video segments 204a, 204b, 204c, . . . , 204n, and third set of video segments 206a, 206b, 206c, . . . , 206n, may be segmented into consistent length, for example, 10 seconds segments. It may be advantageous to have a consistent and smaller file size of segments to be able to quickly push to the content delivery system 160, and also for quick downloading by a media player at the end-user side, such as on the consumer device 110a.

It should be understood by those skilled in the art that various changes may be made and segments of different file sizes (or length) may be used without departure from the scope of the present disclosure. Further, other streaming protocols may require a different processing of media content. Thus, the scope of the disclosure should not be limited to the processing or preparation of media content to allow delivery using different delivery methods, streaming protocols, or distribution system, known in the art. Further, instead of the live input streams and pre-encoded media asset arranged, as shown, different arrangements per the playout schedule 112 may be possible with respect to interstitial content items, such as the first interstitial content 208 and the second interstitial content 210. In accordance with an embodiment, the first interstitial content 208 and the second interstitial content 210 may correspond to non-programming content, such as ads or promotional content targeted for the consumer device 110a.

The insertion of the live input stream manifests, pre-encoded media asset manifests, the interstitial content items may be done on-the-fly based on dynamic scheduling resulting in the playout schedule 112. The insertion may be driven by real-time or near-real-time content context analysis, user-selection on the consumer device 110a, or driven by external data received from an external data source. The stream publishing engine 150 may be configured to insert live input streams, such as the first live input stream 202 and the second live input stream 206, or pre-stored media assets, such as the first interstitial content 208 and the second interstitial content 210, in the disparate live media output stream based on manipulation of the disparate live media output stream manifest for corresponding live channel. In an embodiment, the stream publishing engine 150 may further exclude one or more high quality profiles created for broadcast distribution from the consumer devices 110a, . . . , 110n.

In accordance with an embodiment, each segment of the first set of video segments 202a, 202b, 202c, . . . , 202n, the second set of video segments 204a, 204b, 204c, . . . , 204n, and third set of video segments 206a, 206b, 206c, . . . , 206n, may be further processed to be stored at various quality levels, and content encryption modes for the purposes of adaptive bitrate streaming and digital rights management, for example, the video segment 202a may be stored in a plurality of quality levels or profiles, for example, high definition (HD), high dynamic range (HDR) video, or different quality levels in accordance with specified pixel resolutions, bitrates, frame rates, and/or sample frequencies. Each of the media content, such as 202 to 206, are encoded, segmented, and stored with the plurality of quality levels in the media content master storage system 124. The media content may be re-used to create new variant channels, such as a new variant of the disparate live media output stream, without having to re-encode a selected live input stream or a pre-encoded media asset when the new variant of the disparate live media output stream is created by the stream versioning engine 154 in conjunction with the switch logic manager 130.

For the sake of brevity, and with reference to FIG. 2, there is shown an example of publishing the disparate live media output stream based on dynamic insertion of interstitial content items by the stream playout and distribution system 104 of FIG. 1. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of consumer devices 110a, . . . , 110n, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. In other cases, for example, the stream versioning engine 154 may exclude the one or more high quality profiles provided to support broadcast use cases, or exclude one or more profiles created for consumer distribution. In some other cases, the content encoder/packager 128 may encode and package one or more high quality profiles to support broadcast use cases or include one or more high quality profiles of interstitial content items for the encoded and packaged pre-encoded media asset to support broadcast use cases. Further, based on different operational and technical requirements, publishing of the disparate live media output stream may be different. As descried above, the media content that is prepared and distributed may include both the programming content, such as long-form presentations, short-form presentations, news or sporting events; and non-programming content, such as paid advertisements, public service advertisements, or promotional material.

Figure 3:
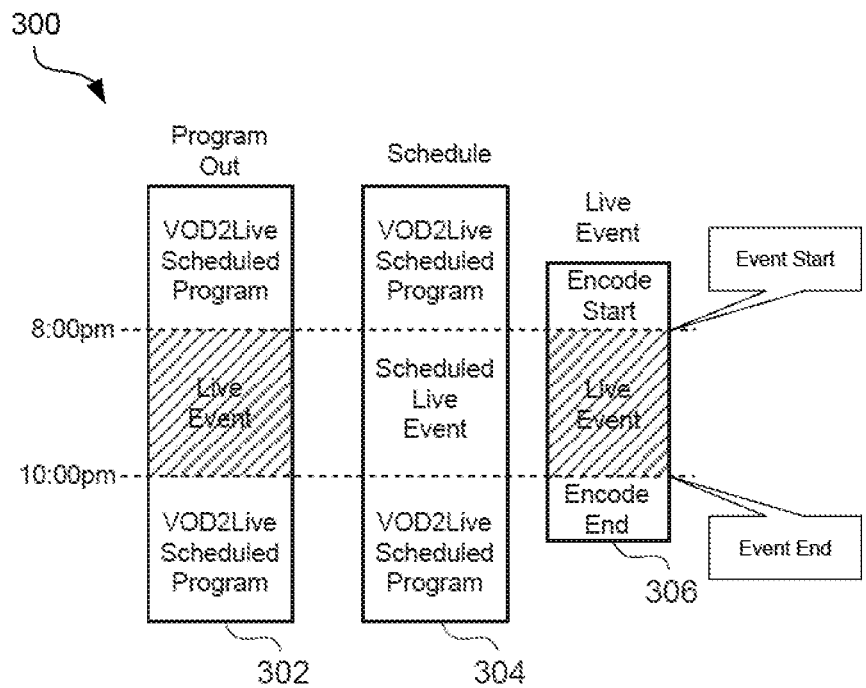
FIG. 3 illustrates a first exemplary scenario associated with disparate live media output stream playout and broadcast distribution by the web playout and distribution system of FIG. 1, in accordance with an exemplary embodiment of the disclosure.

FIG. 3 illustrates a first exemplary scenario associated with disparate live media output stream playout and broadcast distribution by the web playout and distribution system of FIG. 1, in accordance with an exemplary embodiment of the disclosure. Referring to the first exemplary scenario 300 of FIG. 3, there are shown a first disparate live media output stream manifest 302 comprising a scheduled pre-encoded media asset and a live input stream corresponding to a live event, in accordance with a first broadcast profile. There is further shown a schedule 304 of the first disparate live media output stream manifest 302 comprising switch points between a scheduled pre-encoded media asset, a scheduled live input stream, and back to the scheduled pre-encoded media asset, in accordance with a second broadcast profile. There is further shown a live media source input stream 306 comprising only live input stream corresponding to a live event, in accordance with a third broadcast profile. The first exemplary scenario 300 illustrates integration of Live2Live to support channels with limited live content. Thus, there are provided three broadcast profiles in the live adaptive bit-rate (ABR) streaming stack. The live ABR encode may spin up only when required. For example, if the live event is scheduled from 8:00 pm to 10:00 pm, the live media source input stream 306 may switch to live encode on program start. VOD2Live schedule may be resumed on program end. Captions may need to be inserted at live ABR encode. Further, channel branding and other graphics may be inserted at the IP receiving system 155, such as the first IP receiver 156 or the second IP receiver 158. Channel branding and other graphics may also be inserted in live control room but cost may increase. Notwithstanding, both options may be supported depending on the value of the live event. In accordance with an embodiment, additional channel operator functions may be required in case the live event runs long. For example, start the next program in progress or play the next program from the beginning and make up time later.

Figure 4:
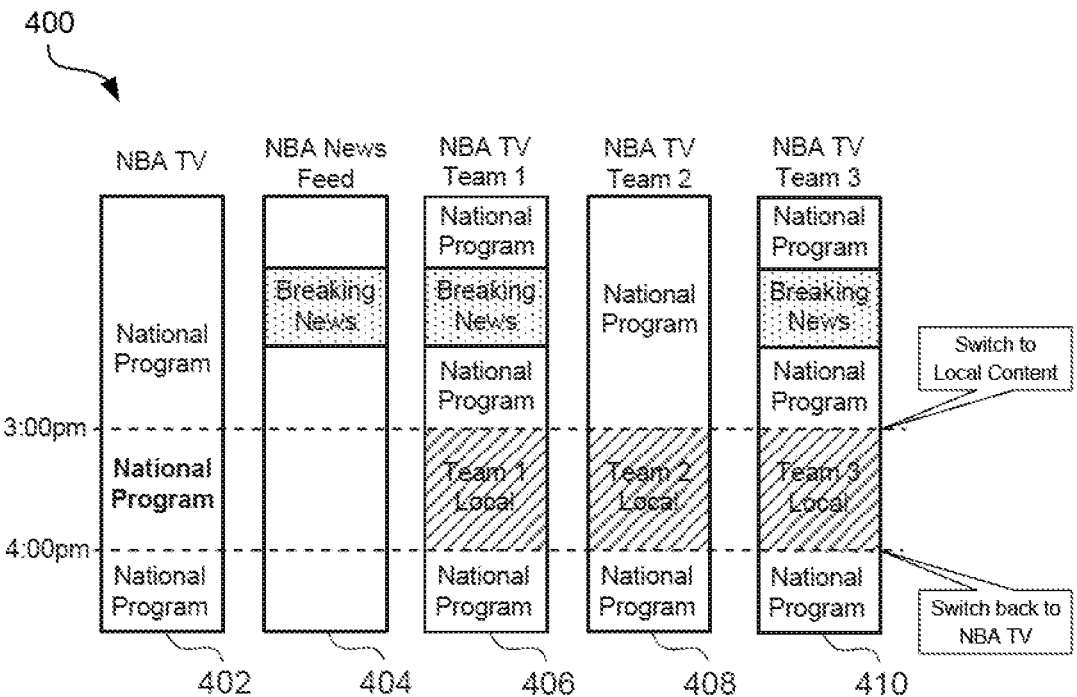
FIG. 4 illustrates a second exemplary scenario associated with disparate live media output stream playout and broadcast distribution by the web playout and distribution system of FIG. 1, in accordance with an exemplary embodiment of the disclosure.

FIG. 4 illustrates a second exemplary scenario associated with disparate live media output stream playout and broadcast distribution by the web playout and distribution system of FIG. 1, in accordance with an exemplary embodiment of the disclosure. Referring to the second exemplary scenario 400 of FIG. 4, there are shown multiple digital variations of a linear channel, such as NBA TV, shown by corresponding disparate live media output stream manifest 402. There is further shown a live media source input stream 404 for, for example NBA news feed, that may be stitched into other the disparate live media output stream manifests.

There are further shown three digital variations that may be created for, for example, three teams. For first team, there is shown corresponding disparate live media output stream manifest 406, for second team, there is shown corresponding disparate live media output stream manifest 408, and for third team, there is shown corresponding disparate live media output stream manifest 410. In respective disparate live media output stream manifests 406, 408, and 410, local team content may be scheduled at certain times of day, for example 3:00 pm to 4:00 pm. In accordance with certain embodiments, some teams may have more local content than others. Based on individual team schedules, the respective disparate live media output stream manifests 406 and 410 corresponding to the two teams may switch team versions to breaking news, such as trades or press conferences. An extra control layer may be provided to switch only relevant team versions. The capability to make last minute decision to switch for non-scheduled events is also provided. In certain cases, content rights may allow switching of team version to the team games. By using the IP receiving system 155, the first team, such as NBA team 1 variant, may be made available in the first team market as a broadcast replacement for the National NBA TV feed. With the IP receiving system 155 converting the signal back to a compatible legacy format the first team may be made available over Cable, Satellite or IPTV. For example, a cable company in the Phoenix market who chose not to carry the NBA TV national feed may now choose to carry the NBA TV phoenix variant. Alternatively, a cable company in the phoenix market who does carry the NBA TV national feed may be willing to pay more to carry the phoenix variant in addition to or as a replacement for the NBA TV national feed.

Figure 5:
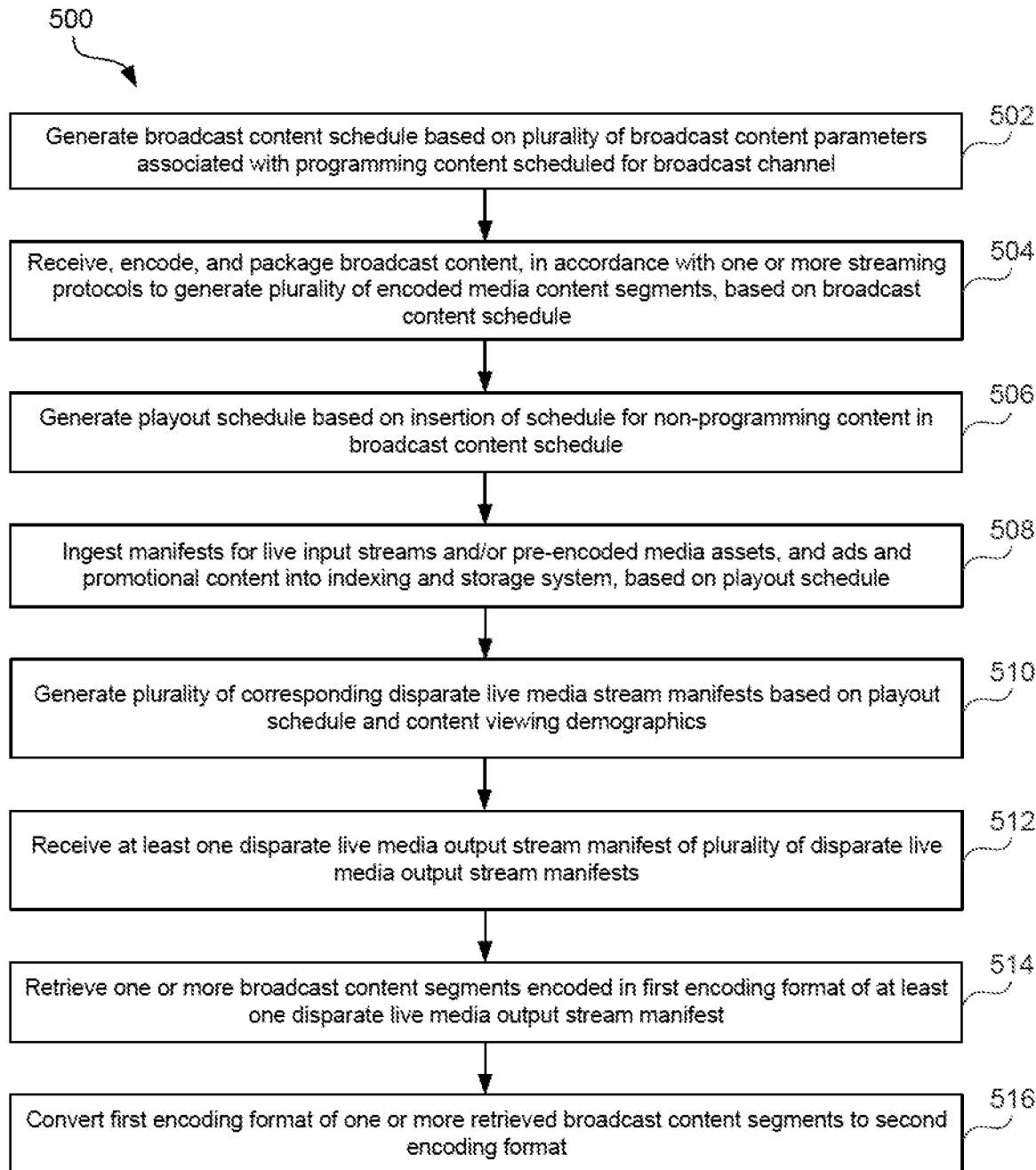
FIG. 5 depicts a flowchart illustrating exemplary operations for disparate live media output stream playout and broadcast distribution in the web playout and distribution system of FIG. 1, in accordance with an exemplary embodiment of the disclosure.

FIG. 5 depicts a flowchart illustrating exemplary operations for disparate live media output stream playout and broadcast distribution in the web playout and distribution system of FIG. 1, in accordance with an exemplary embodiment of the disclosure. FIG. 5 includes flowchart 500 illustrating exemplary operations 502 through 516.

At 502, a broadcast content schedule may be generated based on a plurality of broadcast content parameters associated with the programming content scheduled for a broadcast channel. In accordance with an embodiment, the broadcast network scheduler 132 may be configured to a generate the broadcast content schedule for scheduling the programming content based on the plurality of broadcast content parameters, such as, but not limited to, desired channel theme, content metadata, content rights, and competitive analysis of what competing programming is available on other channels. The broadcast network scheduler 132 may transmit the broadcast content schedule to the content processing system 120 and the traffic system 134 to determine whether the programming content is available and has been processed to the correct format. In accordance with an embodiment, when the programming content is not available, the content processing system 120 may order the programming content. Accordingly, the content processing system 120 receives the programming content, assures the quality, and processes the programming content to a specific standard. The content processing system 120 may further store the processed programming content in the media content master storage system 124. Accordingly, the content encoder/packager 128 in the content processing system 120 may retrieve the programming content from the media content master storage system 124. The content encoder/packager 128 may further encode and package the programming content for web distribution. The programming content may be prepared for web distribution and may be stored in the media storage unit 162 of the content delivery system 160. In an embodiment, the programming content may not available. In such embodiment, control passes to 504.

At 504, broadcast content, in accordance with one or more streaming protocols to generate a plurality of encoded broadcast content segments, may be received, encoded, and packaged based on the broadcast content schedule. In an embodiment, the content encoder/packager 128 in the content processing system 120 may be configured to receive, encode, and package broadcast content (or programming content), in accordance with one or more streaming protocols to generate a plurality of encoded broadcast content segments, based on the broadcast content schedule. Specifically, the content encoder/packager 128 in the content processing system 120 may retrieve the programming content, for example, media content asset, from the media content master storage system 124. The content encoder/packager 128 may further access the media content metadata storage system 122 to determine the media content asset duration and location of non-programming content, such as ad breaks, credits, overlay opportunities, and the like. The content encoder/packager 128 may mark precise ad break locations and condition the media content asset so that the ad break locations fall on boundaries of corresponding broadcast content segments. The content encoder/packager 128 may further insert, for example, tag indicators to mark the credits and potential overlay graphics locations in the media content asset.

The content encoder/packager 128 may further insert in-band triggers to mark the location of the ad breaks, credits, and potential overlay graphic locations for protocols that do not constantly query the manifest for new information but instead calculate the next content to be downloaded based on a defined algorithm. In accordance with another embodiment, the content encoder/packager 128 may include watermarks or in-band metadata to support program viewership measurements in broadcast use cases. The media content asset is thus prepared for the web distribution and hereinafter referred to as pre-encoded media asset. The pre-encoded media asset and the corresponding manifest may be stored in the media storage unit 162 of the content delivery system 160.

At 506, a playout schedule may be generated based on insertion of a schedule for non-programming content in the broadcast content schedule. In accordance with an embodiment, the traffic system 134 may access the media content metadata storage system 122 to determine media content asset duration and break schedule and generate the playout schedule 112. The playout schedule 112 may be generated based on insertion of a schedule for non-programming content in the broadcast content schedule. Thus, the playout schedule 112 includes the schedule for the one or more non-programming content and/or one or more programming content. In accordance with an embodiment, the playout schedule 112 for the one or more non-programming content and the one or more programming content may be generated based on the content viewing demographics.

Prior to generation of the playout schedule 112, the content processing system 120 may further determine whether the non-programming media content, such as the ads and promotional content, is available and has been processed to a correct format. In accordance with an embodiment, when the non-programming content is not available, the content processing system 120 may order the non-programming content. Accordingly, the content processing system 120 receives the non-programming content, assures the quality, and processes the non-programming content to a specific standard. The content processing system 120 may further store the processed non-programming content in the ad/promo content master storage system 126. Accordingly, the content encoder/packager 128 in the content processing system 120 may retrieve the non-programming content from the ad/promo content master storage system 126. The content encoder/packager 128 may further encode and package the non-programming content for web distribution. In accordance with an embodiment, the content encoder/packager 128 may further insert in-band triggers to identify the ad or promotional content and provide special instructions for tracking when it is viewed. In accordance with another embodiment, the content encoder/packager 128 may include watermarks or in-band metadata to support ad and promotional content viewership measurements in broadcast use cases. The non-programming content may be prepared for web distribution and may be stored in the media storage unit 162 of the content delivery system 160.

In accordance with an embodiment, the traffic system 134 may leverage channel preferences to determine when and what network logo to display, when to signal for overlay promotions, and the like. The traffic system 134 may generate the playout schedule 112 and provide the playout schedule 112 to the indexing and storage system 148, and the stream publishing engine 150. The playout schedule 112 thus generated may include manifests for live input streams and/or pre-encoded media assets, and ads and promotional content.

At 508, the manifests for live input streams and/or pre-encoded media assets, and ads and promotional content may be ingested into the indexing and storage system 148, based on the playout schedule 112. In accordance with an embodiment, a proprietary manifest format may be there between the content encoder/packager 128 and the indexing and storage system 148 when additional information carried in the published manifest is required to be passed (not traditionally). The indexing and storage system 148 may index broadcast content segments from each manifest corresponding to the live input streams and/or pre-encoded media assets. The indexing and storage system 148 may log indicators indicating ad breaks, program start, program end, graphic overlays, and the like. The indexing and storage system 148 may further perform checks to validate that the live input streams and/or pre-encoded media assets are complete and ready for inclusion in the disparate live media output stream.

At 510, a plurality of corresponding disparate live media stream manifests may be generated based on the playout schedule 112 and content viewing demographics. In accordance with an embodiment, the stream publishing engine 150 may generate the plurality of disparate live media output streams and the plurality of corresponding disparate live media stream manifests. The stream publishing engine 150 may generate a disparate live media output stream manifest by inserting a new segment from the scheduled pre-encoded media asset manifest or the live input stream manifest into the disparate live media output stream manifest on an interval not greater than the previous content segment duration. In accordance with an embodiment, the plurality of disparate live media output stream manifests, referenced broadcast content segments, DRM licenses, and encryption keys may be delivered over a public or a plurality of private networks, such as the content delivery system 160. Each of the plurality of disparate live media output stream manifests may include a graphical treatment indicator for inserting graphical treatment content. Examples of the graphical treatment content may correspond to, but are not limited to, at least one of a promotional logo, an advertiser graphic, or an animation.

In this regard, the stream publishing engine 150 may generate disparate live media output stream manifest by manipulating the manifests of the pre-encoded media assets or the live input streams. Each of the plurality of disparate live media output stream manifests comprises an index of a plurality of pre-encoded media assets, a plurality of live input streams, and/or the non-programming content. Each of the disparate live media output stream manifests may further include one or more non-programming content indicators and/or one or more overlay indicators. In accordance with various embodiments, the plurality of disparate live media output streams may be generated for different geographical locations. Thus, the plurality of disparate live stream output manifests may be defined to support customized experiences for the first IP receiver 156 and the second IP receiver 158 in different audience segments and for receivers in different localization zones.

When the stream publishing engine 150 encounters indicators marking an ad break within the pre-encoded media asset manifest, the live input stream manifest, or the playout schedule 112, the stream publishing engine 150 may insert such indicators in the disparate live media output stream manifest. The stream publishing engine 150 may further stitch in ads and promotional content included in the playout schedule 112 and/or access the real-time linear ad server 152 to fill one or more portions of the ad break, as defined by the playout schedule 112.

In accordance with an embodiment, one or more non-programming content and one or more programming content included in the playout schedule 112 may be replaced with one or more alternate non-programming content and one or more alternate programming content. The one or more alternate non-programming content and the one or more alternate programming content may be selected based on the real-time or near-real-time content viewing demographics or content viewing data received from the media player. The stream publishing engine 150 may include one or more content replacement indicators that indicate replacement of one or more non-programming content and/or programming content. In an embodiment, the one or more content replacement indicators may cause replacement of one or more pre-encoded media assets of the plurality of pre-encoded media assets or one or more live input streams of the plurality of live input streams with one or more alternate pre-encoded media assets or one or more alternate live input streams. A use case is described herein for CNN, for example, where a local programming block is inserted in a particular country in partnership with a local broadcaster. In this case, a switch from the national schedule which could be pre-encoded assets or live international source may be performed to an alternate live local source stream. The one or more content replacement indicators may cause replacement of non-programming content and/or programming content. For example, the stream publishing engine 150 may signal one or more ads and promotional content for replacement and insert placeholder content to replace such ads and promotional content that were scheduled in the playout schedule 112 or decisioned in real-time. The stream publishing engine 150 may further signal one or more programming content blocks to be replaced with other programming content more desirable for the audience demographic, segment or location of a specific consumer device. The stream publishing engine 150 may further exclude one or more high quality profiles created for broadcast distribution from the consumer devices 110a, . . . , 110n.

In accordance with an embodiment, as described above, the plurality of disparate live stream output manifests may be required to support different DRM types and consumer device categories and IP receiving system 155. In accordance with another embodiment, the plurality of disparate live stream output manifests may be generated for IP receivers, such as the first IP receiver 156 and the second IP receiver 158, located in different localization zones. Accordingly, the stream publishing engine 150 may mark one or more ads and promotional content for potential replacement. Such marked one or more ads and promotional content may be replaced with ads and promotional content for corresponding localization zone, if there are ads and promotional content that may maximize the revenue over the ad or promotional content placed in accordance with the playout schedule 112. Further, the stream publishing engine 150 may replace one or more programing content blocks with other programming content more desirable for corresponding localization zone. The stream publishing engine 150 may further exclude one or more low quality profiles from the IP receivers created for consumer devices 110a, . . . , 110n.

In accordance with an embodiment, the stream publishing engine 150 may access the real-time linear ad server 152 to fill one or more portions of the ad break, as defined by the playout schedule 112. Thus, one or more ads and promotional content may be inserted in real-time as designated by the real-time linear ad server 152.

The real-time linear ad server 152 may leverage real-time audience data from one or more media players in set-top boxes and smart TVs that support ACR, or ATSC 3.0, Nielsen standards, and the like, to determine the current audience makeup. Accordingly, the real-time linear ad server 152 may select ads that may provide the maximum revenue yield based on real-time data. The real-time linear ad server 152 and/or the ad/promo campaign manager 114 may abide by traditional broadcast rules governing ad separation, ad exclusivity, ad positioning, and the like, for the individual ad pods and the overall program, when determining which ads provide the maximum revenue yield.

The real-time linear ad server 152 and/or the ad/promo campaign manager 114 has knowledge of localization zones, thus, may mark ads and promotional content where localized ads and promotional content may provide higher revenue yield. Therefore, the real-time linear ad server 152 and/or the ad/promo campaign manager 114 may perform decisioning ads and promotional content for specific locations to support a plurality of disparate live media output stream manifests for such individual geographic regions.

Further, the real-time linear ad server 152 and/or the ad/promo campaign manager 114 has knowledge of audience demographics and segments and may mark ads and promotional content targeted at specific audience demographics or segments. Accordingly, such ads and promotional content may be potentially replaced on consumer devices capable of individual targeting, if such consumer devices are not a part of that audience demographic or segment and the entire ad pod is not marked for replacement.

In accordance with an embodiment, the stream publishing engine 150 may transmit the output to the stream versioning engine 154 to create an appropriate variant of the disparate live media output stream manifest. The stream versioning engine 154 may receive versioning instructions from the switch logic manager 130. The switch logic manager 130 may define a number of disparate live media output stream manifests based on desired ad and content localizations, as well as ad rules for audience demographic and segment targeting. Such disparate live media stream manifest may be generated for the consumer device 110a based on its ability to support one-to-one targeted ad insertion.

In accordance with an embodiment, the stream versioning engine 154 may insert or pass through ad indicators for the consumer device 110a to replace the entire ad break with individual targeted ads and may stitch in placeholder content to replace the scheduled ads based on the instructions provided from the switch logic manager 130. In accordance with another embodiment, the stream versioning engine 154 may insert or pass through ad indicators to mark individual ads for potential replacement with targeted ads based on the user's location, known demographic information (such as females over 50 years), and known audience segments (for example auto intender for a luxury vehicle). In accordance with another embodiment, the stream versioning engine 154 may stitch in alternate programming content based on defined localizations or audience segment preferences. In accordance with another embodiment, the stream versioning engine 154 may exclude the one or more high quality profiles created for broadcast distribution from the consumer devices 110a, ..., 110n. In accordance with an embodiment, the stream versioning engine 154 may be configured to generate versions of the plurality of live input stream manifests corresponding to the each of the live input streams to be published to various the IP receiving system 155.

At 512, at least one disparate live media output stream manifest of the plurality of disparate live media output stream manifests may be received. In an embodiment, the IP receiving system 155 of the stream playout and distribution system 104, such as the first IP receiver 156 or the second IP receiver 158, may be configured to receive at least one disparate live media output stream manifest of the plurality of disparate live media output stream manifests. In accordance with an embodiment, the IP receiving system 155, such as the first IP receiver 156 or the second IP receiver 158, may be configured to receive one or a plurality of the specified high-quality profiles that may be included in one or a plurality of disparate live stream manifest outputs targeted at the localization zone of the IP receiving system 155.

At 514, one or more broadcast content segments encoded in a first encoding format of the at least one disparate live media output stream manifest may be retrieved. In an embodiment, the IP receiving system 155 of the stream playout and distribution system 104, such as the first IP receiver 156 or the second IP receiver 158, may be configured to retrieve the one or more broadcast content segments encoded in the first encoding format of the at least one disparate live media output stream manifest. The IP receiving system 155 of the stream playout and distribution system 104, such as the first IP receiver 156 or the second IP receiver 158, may be configured to download the referenced one or more broadcast content segments from the content delivery system 160. Once downloaded, the IP receiving system 155 of the stream playout and distribution system 104 may decrypt and decode the one or more broadcast content segments.

At 516, the first encoding format of the one or more retrieved broadcast content segments may be converted to a second encoding format. In an embodiment, the IP receiving system 155 of the stream playout and distribution system 104, such as the first IP receiver 156 or the second IP receiver 158, may be configured to convert the first encoding format of the one or more retrieved broadcast content segments in the first encoding format to the second encoding format. The second encoding format includes an output from an analog interface, a modified resolution of the one or more broadcast content segments, or cropped the one or more broadcast content segments. The second encoding format may be compatible with traditional distribution techniques, as required by the location of an operator. In an example, the second encoding format may be uncompressed over an analog interface or may be in an uncompressed digital format over a serial digital interface (SDI). In another example, the second encoding format may be a re-encode of the decoded broadcast content segments using a CODEC that meets requirements of the operator of the receive location over an IP connection or Asynchronous Serial Interface. In another example, the second encoding format may be down conversion from a high definition video to a standard definition, as required by the operator of the receive location. In another example, the second encoding format may be a down conversion that may be produced by cropping or letterboxing the video as required by the stream owner operator and may be done as signaled on a per program ad or promotional content basis.

In accordance with an embodiment, the IP receiving system 155 of the stream playout and distribution system 104, such as the first IP receiver 156 or the second IP receiver 158, may be configured to parse through the disparate live media output stream manifest that may include the graphical treatment indicator. Accordingly, portions in the one or more broadcast content segments may be identified where graphical treatment content is to be rendered. Accordingly, the one or more broadcast content segments may be modified to include the graphical treatment content prior to converting the one or more broadcast content segments into the second encoding format. In accordance with an embodiment, the IP receiving system 155 of the stream playout and distribution system 11 may layer graphics on top of the decoded one or more broadcast content segments prior to the analog or uncompressed digital output or before the re-encode of the broadcast content. Such graphics may be signaled by indicators in the disparate live media output stream manifest or triggers embedded in the broadcast content segments. The graphics may be used to provide an experience equivalent to an experience provided on traditional broadcast channels. The graphics may include a network logo, an advertiser logo, a promotional logo, a banner type graphic, or a squeeze back of the disparate live media output stream with a promotional or advertiser graphic wrapping the disparate live media output stream. The graphic may further support motion, animations, and varying levels of transparency when overlaid on the disparate live media output stream.

During conversion, the IP receiving system 155 of the stream playout and distribution system 104 may be further configured to correct discrepancies during transaction between the plurality of pre-encoded media assets and/or the plurality live input streams and/or broadcast profiles. For example, the IP receiving system 155 of the stream playout and distribution system 104 may correct errors induced when switching between the pre-encoded media assets or live input streams. The IP receiving system 155 of the stream playout and distribution system 104 may further correct errors induced when switching between different video resolutions or encoding profiles.

In accordance with an embodiment, the IP receiving system 155 of the stream playout and distribution system 104 may be further configured to include a local storage. Accordingly, the IP receiving system 155 of the stream playout and distribution system 104 may be provided with advanced knowledge of pre-encoded media assets that may be included in one or a plurality of disparate live media output stream manifest. In such case, the broadcast content segments of the pre-encoded media assets may be pre-downloaded and stored in the IP receiving system 155 of the stream playout and distribution system 104. Accordingly, the requirement that an IP connection must always maintain necessary bandwidth to support the minimum specified live stream input bitrate or risk service interruptions may be eliminated. In accordance with an embodiment, live input streams may also be supported if live input stream are encoded locally or otherwise acquired in such a manner that did not rely on an IP connection that was not able to reliably support the minimum live stream input bitrate.

In accordance with an embodiment, the IP receiving system 155 of the stream playout and distribution system 104 may include a stream generation system with sufficient local storage and processors. In such an embodiment, the stream generation system may be configured to ingest the playout schedule 112 with all the ads specified ahead of time and index the manifests for the pre-encoded media assets included in the playout schedule 112. The stream generation system may be further configured to download the broadcast content segments, DRM licenses, and encryption keys, into local storage for the pre-encoded media assets included in the playout schedule 112. The stream generation system may be further configured to generate a disparate live media output stream manifest according to the playout schedule 112. The stream generation system may further comprise sufficient processors configured to receive the disparate live media output stream manifest, decrypt and decode the referenced broadcast content segments from the local storage, and process event indicators in the disparate live media output stream manifest or triggers embedded in the broadcast content segments. The stream generation system may be further configured to layer graphics on top of the decoded disparate live media output stream, and convert the stream back to a format, such as the second encoding format, compatible with traditional distribution techniques as required by the operator of the receive location. During conversion, the stream generation system may correct errors induced when switching between the pre-encoded media assets or live input streams. The stream generation system may further correct errors induced when switching between different video resolutions or encoding profiles. In such an embodiment, the stream generation system may eliminate the requirement that the IP connection must always be available or risk service interruptions.

In accordance with an embodiment, the IP receiving system 155 of the stream playout and distribution system 104 may serve as a proxy or cache to deliver the broadcast content segments to end consumer devices 110a, . . . , 110n. The IP receiving system 155 of the stream playout and distribution system 104 may further conserve Internet bandwidth to deliver content reliably to multiple users in a location that share a constrained Internet connection. In accordance with an embodiment, the IP receiving system 155 of the stream playout and distribution system 104 may be authorized to decrypt and store the decrypted broadcast content segments and disparate live media output stream manifests. The IP receiving system 155 of the stream playout and distribution system 104 may re-write one or a plurality of disparate live media output stream manifests to remove the DRM key references. The IP receiving system 155 of the stream playout and distribution system 104 may serve as a proxy or cache to deliver the rewritten manifests and decrypted broadcast content segments to end consumer devices 110a, . . . , 110n. The stream may be delivered over a secure local network to a plurality of consumer devices using 3rd party applications or mobile web sites that do not support DRM protected content.

In accordance with an embodiment, the IP receiving system 155 of the stream playout and distribution system 104 may be authorized to act as a token server to authorize consumer devices on a local network. The IP receiving system 155 of the stream playout and distribution system 104 may re-write one or a plurality of disparate live media output stream manifests to provide the local token server address to the IP receiving system 155. Further, the player configuration may be designed to use relative pathing to acquire an authorization token from the IP receiving system 155. In accordance with an embodiment, the IP receiving system 155 of the stream playout and distribution system 104 may deliver the stream in the first encoding format over a local network to the consumer devices 110b, . . . , 110n that support DRM. In such an embodiment, a central authorization service for consumer devices 110b, . . . , 110n on a local LAN sharing a common internet connection may be extremely difficult to manage as the number of receiver locations increase.

In accordance with an embodiment, the Ad decisioning server 106 may be configured to monitor a real-time and/or near real-time content viewing demographics based on data received from one or more media players in the consumer devices 110a, . . . , 110n. The Ad decisioning server 106 may be further configured to schedule the one or more pre-encoded media assets based on the real-time and/or near-real-time content viewing demographics.

Figure 6:
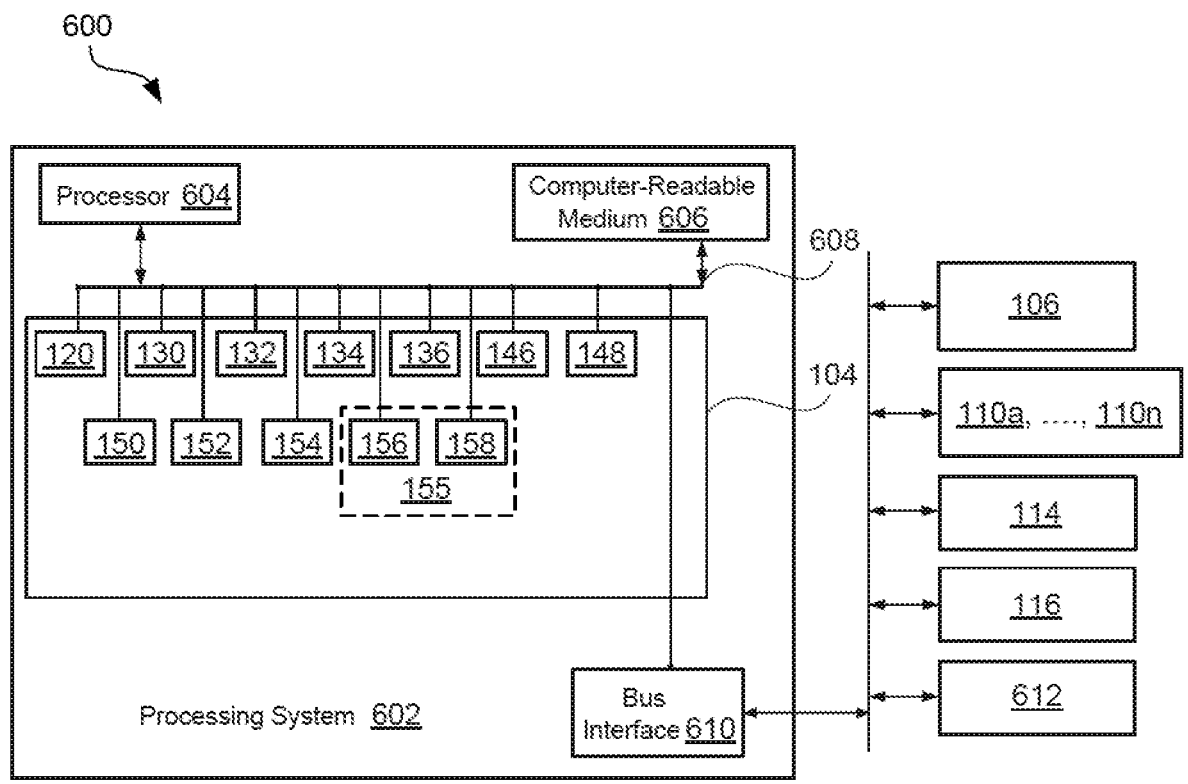
FIG. 6 is a conceptual diagram illustrating an example of a hardware implementation for a web playout and distribution system employing a processing system for disparate live media output stream playout and broadcast distribution, in accordance with an exemplary embodiment of the disclosure.

FIG. 6 is a conceptual diagram illustrating an example of a hardware implementation for a web playout and distribution system employing a processing system for disparate live media output stream playout and broadcast distribution, in accordance with an exemplary embodiment of the disclosure.

Referring to FIG. 6, the hardware implementation shown by a representation 600 for the stream playout and distribution system 104 employs a processing system 602 for disparate live media output stream playout and broadcast distribution, in accordance with an exemplary embodiment of the disclosure, as described herein.

In some examples, the processing system 602 may comprise one or more hardware processor 604, a non-transitory computer-readable medium 606, a bus 608, a bus interface 610, and a transceiver 612. FIG. 6 further illustrates the content processing system 120, the switch logic manager 130, the broadcast network scheduler 132, the traffic system 134, the schedule planning database 136, the system monitoring unit 146, the indexing and storage system 148, the stream publishing engine 150, the real-time linear ad server 152, the stream versioning engine 154, the first IP receiver 156, and the second IP receiver 158, as described in detail in FIGS. 1A and 1B.

The hardware processor 604 may be configured to manage the bus 608 and general processing, including the execution of a set of instructions stored on the computer-readable medium 606. The set of instructions, when executed by the processor 604, causes the stream playout and distribution system 104 to execute the various functions described herein for any particular apparatus. The hardware processor 604 may be implemented, based on a number of processor technologies known in the art. Examples of the hardware processor 604 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 606 may be used for storing data that is manipulated by the processor 604 when executing the set of instructions. The data is stored for short periods or in the presence of power. The computer-readable medium 606 may also be configured to store data for one or more of the content processing system 120, the switch logic manager 130, the broadcast network scheduler 132, the traffic system 134, the schedule planning database 136, the system monitoring unit 146, the indexing and storage system 148, the stream publishing engine 150, the real-time linear ad server 152, the stream versioning engine 154, the first IP receiver 156, and the second IP receiver 158.

The bus 608 is configured to link together various circuits. In this example, the media content packaging and distribution system 102 employing the processing system 602 and the non-transitory computer-readable medium 606 may be implemented with bus architecture, represented generally by bus 608. The bus 608 may include any number of interconnecting buses and bridges depending on the specific implementation of the media content packaging and distribution system 102 and the overall design constraints. The bus interface 610 may be configured to provide an interface between the bus 608 and other circuits, such as, the transceiver 612, and external devices, such as the Ad decisioning server 106, and the consumer devices 110a, . . . , 110n.

The transceiver 612 may be configured to provide a communication of the stream playout and distribution system 104 with various other apparatus, such as the Ad decisioning server 106 and the consumer devices 110a, . . . , 110n. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 6 may include software whose corresponding code may be executed by at least one processor, for across multiple processing environments. For example, the content processing system 120, the switch logic manager 130, the broadcast network scheduler 132, the traffic system 134, the schedule planning database 136, the system monitoring unit 146, the indexing and storage system 148, the stream publishing engine 150, the real-time linear ad server 152, the stream versioning engine 154, the first IP receiver 156, and the second IP receiver 158 may include software that may be executed across a single or multiple processing environments.

In an aspect of the disclosure, the processor 604, the computer-readable medium 606, or a combination of both may be configured or otherwise specially programmed to execute the operations or functionality of the content processing system 120, the switch logic manager 130, the broadcast network scheduler 132, the traffic system 134, the schedule planning database 136, the system monitoring unit 146, the indexing and storage system 148, the stream publishing engine 150, the real-time linear ad server 152, the stream versioning engine 154, the first IP receiver 156, the second IP receiver 158, or various other components described herein, as described with respect to FIGS. 1A to 5.

Various embodiments of the disclosure comprise the media packaging and distribution system 102 that may be configured for disparate live media output stream playout and broadcast distribution. The media packaging and distribution system 102 may comprise, for example, the stream playout and distribution system 104. The stream playout and distribution system 104 may further comprise the content processing system 120, the switch logic manager 130, the broadcast network scheduler 132, the traffic system 134, the schedule planning database 136, the system monitoring unit 146, the indexing and storage system 148, the stream publishing engine 150, the real-time linear ad server 152, the stream versioning engine 154, the first IP receiver 156, the second IP receiver 158. In accordance with an embodiment, one or more first processors in broadcast network scheduler 132 may be configured to generate a broadcast content schedule based on a plurality of broadcast content parameters associated with programming content scheduled for a broadcast channel. The one or more first processors in the content processing system 120 may further receive, encode, and package broadcast content in accordance with one or more streaming protocols to generate a plurality of encoded broadcast content segments. The one or more first processors in the traffic system 134 may further generate a playout schedule, such as the playout schedule 112, based on insertion of a schedule for non-programming content in the broadcast content schedule. The one or more first processors in the stream publishing engine 150 may further generate a plurality of disparate live media output stream manifests based on the playout schedule 112 and content viewing demographics. Each of the plurality of corresponding disparate live media output stream manifests may comprise an index of a plurality of pre-encoded media assets, a plurality of live input streams, and/or the non-programming content. One or more second processors in the first IP receiver 156 and the second IP receiver 158 may be configured to receive at least one disparate live media output stream manifest of the plurality of disparate live media output stream manifests. The one or more second processors may be further configured to retrieve one or more broadcast content segments encoded in a first encoding format of the at least one disparate live media output stream manifest. The one or more second processors may be further configured to convert the one or more retrieved broadcast content segments to a second encoding format. The second encoding format is in accordance with one or more broadcasting protocols.

In accordance with an embodiment, the one or more second processors may be further configured to correct discrepancies during transaction between the plurality of pre-encoded media assets, the plurality live input streams, and/or broadcast profiles. The plurality of pre-encoded media assets, the plurality of live input streams, and/or the plurality of encoded broadcast content segments may include at least one broadcast profile. The one or more retrieved broadcast content segments may be converted to the second encoding format based on the at least one broadcast profile.

In accordance with an embodiment, the plurality of pre-encoded media assets may include one or more non-programming content and/or one or more programming content. Further, the playout schedule 112 may include the schedule for the one or more non-programming content and/or one or more programming content. One or more non-programming content and one or more programming content included in the playout schedule may be selected based on one or more rules governing ad separation, ad exclusivity, and/or ad positioning, data pertaining to regional media assets, revenue associated with the regional media assets. The playout schedule 112 for the one or more non-programming content and the one or more programming content may be generated by the one or more processors based on the content viewing demographics. The plurality of disparate live media output stream manifests may include one or more non-programming content indicators and/or one or more overlay indicators.

In accordance with an embodiment, a media player in a consumer device may be configured to retrieve non-programming content from the Ad decisioning server 106 when the media player encounters the one or more non-programming content indicators and/or the one or more overlay indicators in the at least one disparate live media output stream manifest.

In accordance with an embodiment, one or more third processors in the real-time linear ad server 152 may be configured to monitor a real-time and/or near real-time content viewing demographics based on data received from one or more media players. The one or more third processors may be further configured to schedule the one or more pre-encoded media assets based on the real-time and/or near-real-time content viewing demographics. In accordance with an embodiment, the one or more third processors may be configured to receive the real-time and/or near-real-time audience data from one or more media players that support CR, ATSC 3.0, and/or Nielsen standards. In accordance with another embodiment, the one or more third processors may be further configured to receive on one or more rules governing media asset separation, media asset exclusivity, media asset positioning, data pertaining to regional media assets, and/or revenue associated with the regional media assets. In accordance with another embodiment, the one or more third processors may be further configured to replace one or more non-programming content and one or more programming content included in the broadcast schedule with one or more alternate non-programming content and one or more alternate programming content. The one or more alternate non-programming content and the one or more alternate programming content may be selected based on the real-time or near-real-time content viewing demographics. In accordance with another embodiment, the one or more third processors may be further configured to replace one or more non-programming content and one or more programming content based on real-time or near-real-time content viewing data received from a media player.

In accordance with an embodiment, the plurality of disparate live media output stream manifests may include one or more content replacement indicators. The one or more content replacement indicators may cause replacement of one or more pre-encoded media assets of the plurality of pre-encoded media assets or one or more live input streams of the plurality of live input streams with one or more alternate pre-encoded media assets or one or more alternate live input streams. The one or more content replacement indicators may indicate replacement of one or more non-programming content, and/or one or more programming content. In accordance with an embodiment, the plurality of disparate live media output streams may be created for different geographical locations. Each of the plurality of disparate live media output stream manifests include a graphical treatment indicator. The one or more second processors may be configured to parse through the plurality of disparate live media output stream manifests including the graphical treatment indicator to identify portions in the one or more broadcast content segments where graphical treatment content is to be rendered. The one or more second processors may be further configured to modify the one or more broadcast content segments to include the graphical treatment content prior to converting the one or more broadcast content segments into the second encoding format. The graphical treatment content may correspond to at least one of a promotional logo, an advertiser graphic, or an animation.

In accordance with an embodiment, the second encoding format may include a format that may be outputted from an analog interface, a modified resolution of the one or more broadcast content segments, or cropped one or more broadcast content segments.

Various embodiments of the disclosure may provide a receiving system, such as the first IP receiver 156, and the second IP receiver 158, one or more processors configured to receive at least one disparate live media output stream manifest and retrieve one or more broadcast content segments encoded in a first format based on the at least one disparate live media output stream manifest. The one or more processors may be further configured to convert the one or more retrieved broadcast content segments to a second encoding format, wherein the second encoding format is in accordance with one or more content distribution protocols. The one or more processors may be further configured to correct one or more discrepancies encountered during conversion of the one or more retrieved broadcast content segments. In accordance with an embodiment, the IP receiving system 155 includes a storage unit that is configured to store the one or more retrieved broadcast content segments.

In accordance with an embodiment, the IP receiving system 155 may include a storage unit that may be configured to store the one or more retrieved broadcast content segments. The IP receiving system 155 may further receive advanced knowledge of the playout schedule 112 and pre-fetch the broadcast content segments referenced in the corresponding manifests to be stored in the storage unit. The storage unit may serve as a local cache for the broadcast content segments. The IP receiving system 155 may be configured to obtain a broadcast content segment and produce a version of the disparate live media output stream manifest based on a content key. The IP receiving system 155 may be further configured to provide authentication and authorization services to control access to the broadcast content.

Various embodiments of the disclosure may provide an apparatus, such as the IP receiving system 155, comprising one or more processors configured to receive a plurality of playout schedules. The one or more processors may further download broadcast content segments, keys and licenses referenced in the plurality of playout schedules. The broadcast content segments may have a first encoding format. The one or more processors may further generate a plurality of a disparate live media output stream manifest based on the plurality of playout schedules. The one or more processors may further retrieve one or more broadcast content segments in the first encoding format from a local memory. The one or more processors may further convert the broadcast content segments to a second encoding format, wherein the second encoding format is in accordance with one or more content at distribution protocols.

Various embodiments of the disclosure may provide a computer-readable medium, such as the non-transitory computer-readable medium 606, having stored thereon, computer implemented instruction that when executed by the processor 604 causes the media packaging and distribution system 102 to execute operations for disparate live media output stream playout and broadcast distribution. In accordance with an embodiment, the processor 604 causes the stream playout and distribution system 104 in the media packaging and distribution system 102 to execute operations to generate a broadcast content schedule based on a plurality of broadcast content parameters associated with programming content scheduled for a broadcast channel. The processor 604 further causes the stream playout and distribution system 104 in the media packaging and distribution system 102 to execute operations to receive, encode, and package broadcast content in accordance with one or more streaming protocols to generate a plurality of encoded broadcast content segments. The processor 604 further causes the stream playout and distribution system 104 in the media packaging and distribution system 102 to execute operations to generate a playout schedule, such as the playout schedule 112, based on insertion of a schedule for non-programming content in the broadcast content schedule. The processor 604 further causes the stream playout and distribution system 104 in the media packaging and distribution system 102 to execute operations to generate a plurality of disparate live media output stream manifests based on the playout schedule 112 and content viewing demographics. Each of the plurality of corresponding disparate live media output stream manifests may comprise an index of a plurality of pre-encoded media assets, a plurality of live input streams, and/or the non-programming content. The processor 604 further causes the stream playout and distribution system 104 in the media packaging and distribution system 102 to execute operations to receive at least one disparate live media output stream manifest of the plurality of disparate live media output stream manifests. The processor 604 further causes the stream playout and distribution system 104 in the media packaging and distribution system 102 to execute operations to retrieve one or more broadcast content segments encoded in a first encoding format of the at least one disparate live media output stream manifest. The processor 604 further causes the stream playout and distribution system 104 in the media packaging and distribution system 102 to execute operations to convert the one or more retrieved broadcast content segments to a second encoding format. The second encoding format is in accordance with one or more broadcasting protocols.

Given that the Internet has spawned rapid changes in how video is delivered, several solutions employing new internet protocols have been developed to replace the need for expensive transport, for example, satellite transport. These solutions are gaining popularity for channels with a limited number of receive locations, but such solutions do not address the high cost of the channel production itself or delivery to numerous receive locations. The solutions also fail to recognize that existing delivery protocols, such as HLS and DASH, are sufficient, in many cases, to produce and deliver channels at scale over a traditional content delivery network for a much lower cost.

Thus, the stream playout and distribution system 104 in the media packaging and distribution system 102 may be configured to manipulate the text-based pre-encoded media asset manifest and/or live input stream manifest to produce a new disparate live media output stream manifest. The disparate live media output stream manifest may be delivered to a contemporary receiver that supports modern web streaming protocols as the input and may provide a compatible legacy format as the output. The same live channels may also be delivered directly to Internet connected consumer devices eliminating need for parallel distribution processes. The only requirement is that to maintain broadcast quality through the IP receiving system transcode, the preparation for web distribution should include at least one additional high-quality version of the content.

Further, the broadcast content itself does not need to be processed beyond the initial creation of the live input streams and pre-encoded media assets prepared for web distribution. Thus, creation and distribution of new or variant channels become extremely inexpensive. The creation and distribution may be based solely on the cost to manipulate the manifests, which provide the instructions for the IP receiving systems or consumer devices to execute. The stream playout and distribution system 104 may also support targeted ad insertion at the IP receiving system 155 or individual consumer devices through the insertion of tags in the disparate live media output stream manifest. The stream playout and distribution system 104 may further leverage the processing power of the IP receiving systems and consumer devices to insert targeted channel graphics and overlay advertisements and promotions.

Further, in existing systems, audience for low cost and variant channels generated through manifest manipulation has been limited to the stream owner's digital customers on consumer devices. The development of the IP receiving system 155 in the stream playout and distribution system 104, that supports modern web protocols as the input and may convert the digital channel back to a more traditional format on the output, increases the available audience for these channels to include customers using third party apps and devices that require more traditional channel distribution methods.

Such receiver may further enable the cost of traditional broadcast channel production and distribution to be dramatically reduced. For channels consisting mostly of pre-produce content, the playout server, graphics system, and broadcast encoder may be replaced with simple manifest manipulation. Satellite distribution may be replaced with Internet delivery. Additionally, techniques common in digital streaming may increase the capabilities of the broadcast infrastructure, enabling near real-time Ad decisioning and channel versioning for regional advertising and content localization.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing a disparate live media output stream using pre-encoded media assets.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
a memory configured to store instructions; and
a processor configured to execute the instructions to perform operations, wherein the processor is further configured to:
generate a new version of a disparate live media output stream manifest based on insertion of a plurality of segments of at least one of a pre-encoded media asset or a live input stream into the disparate live media output stream manifest,
wherein each segment of the plurality of segments corresponds to a different quality level and a different content encryption mode, and
wherein the plurality of segments corresponds to broadcast content segments encoded in a first encoding format of the new version of the disparate live media output stream manifest;

convert the broadcast content segments encoded in the first encoding format to a second encoding format in accordance with a broadcasting protocol;

re-write the disparate live media output stream manifest to remove a digital right management (DRM) key reference; and serve as a proxy to deliver the rewritten disparate live media output stream manifest and decrypted broadcast content segments to a consumer device.

2. The system according to claim 1, wherein the processor is further configured to correct discrepancies during transaction between the pre-encoded media asset, the live input stream, or a broadcast profile.

3. The system according to claim 1, wherein at least one of the pre-encoded media asset, the live input stream, or the broadcast content segments include a broadcast profile, and wherein the broadcast content segments are converted to the second encoding format based on the broadcast profile.

4. The system according to claim 1, wherein the processor is further configured to generate the disparate live media output stream manifest based on a playout schedule and content viewing demographics, wherein the playout schedule includes a schedule for at least one of a non-programming content or a programming content, and wherein the non-programming content and the programming content included in the playout schedule are selected based on rules governing ad separation, ad exclusivity, ad positioning, data pertaining to regional media assets, or revenue associated with the regional media assets.

5. The system according to claim 4, wherein the processor is further configured to replace the non-programming content and the programming content included in a broadcast schedule with an alternate non-programming content and an alternate programming content, wherein the alternate non-programming content and the alternate programming content are selected based on the content viewing demographics in real-time or near-real-time, and wherein the content viewing demographics is based on data received from a media player.

6. The system according to claim 1, wherein the disparate live media output stream manifest includes at least one of a non-programming content indicator or an overlay indicator.

7. The system according to claim 6, wherein a non-programming content is retrieved from an ad decisioning server by a media player in the consumer device, and wherein the non-programming content is retrieved based on the non-programming content indicator or the overlay indicator encountered by the media player in the disparate live media output stream manifest.

8. The system according to claim 1, wherein the processor is further configured to:

monitor a real-time or near real-time content viewing demographics based on data received from a media player; and schedule the pre-encoded media asset based on the real-time or near-real-time content viewing demographics.

9. The system according to claim 1, wherein the processor is further configured to:

re-write the disparate live media output stream manifest to provide a local token server address to the system; and acquire an authorization token from the system based on a relative pathing.

10. The system according to claim 1, wherein the disparate live media output stream manifest includes a content replacement indicator, and wherein the content replacement indicator causes a replacement of the pre-encoded media asset with an alternate pre-encoded media asset or a replacement of the live input stream with an alternate live input stream.

11. The system according to claim 1, wherein the disparate live media output stream is created for a defined geographical location.

12. The system according to claim 1, wherein the processor is further configured to:

parse through the disparate live media output stream manifest that includes a graphical treatment indicator to identify a portion in the broadcast content segments where graphical treatment content is to be rendered, wherein the graphical treatment content corresponds to a promotional logo, an advertiser graphic, or an animation; and modify the broadcast content segments to include the graphical treatment content prior to the conversion of the broadcast content segments into the second encoding format.

13. The system according to claim 1, wherein the second encoding format includes a format that is outputted from an analog interface, a modified resolution of the broadcast content segments, a cropped version of the broadcast content segments, or associated with a location of an entity that distributes broadcast content.

14. The system according to claim 1, wherein the processor is further configured to:

generate a playout schedule based on an insertion of a schedule for a non-programming content in a broadcast content schedule; and generate the broadcast content schedule based on broadcast content parameters associated with a programming content, wherein the programming content is scheduled for a broadcast channel; and encode and package a broadcast content to generate the broadcast content segments based on a streaming protocol.

15. The system according to claim 14, wherein the processor is further configured to:

receive advanced knowledge of the pre-encoded media asset included in the playout schedule;

pre-download the broadcast content segments of the pre-encoded media asset included in the playout schedule in a storage unit;

obtain the broadcast content segments and produce the new version of the disparate live media output stream manifest based on a content key; and provide authentication and authorization services to control an access to the broadcast content.

16. A method, comprising:

generating, by a processor, a new version of a disparate live media output stream manifest based on insertion of a plurality of segments of at least one of a pre-encoded media asset or a live input stream into the disparate live media output stream manifest, wherein each segment of the plurality of segments corresponds to a different quality level and a different content encryption mode, and wherein the plurality of segments corresponds to broadcast content segments encoded in a first encoding format of the new version of the disparate live media output stream manifest;

converting, by the processor, the broadcast content segments encoded in the first encoding format to a second encoding format in accordance with a broadcasting protocol;

re-writing, by the processor, the disparate live media output stream manifest to remove a digital right management (DRM) key reference; and serving, by the processor, as a proxy to deliver the rewritten disparate live media output stream manifest and decrypted broadcast content segments to a consumer device.

17. The method according to claim 16, wherein at least one of the pre-encoded media asset, the live input stream, or the broadcast content segments include a broadcast profile, and wherein the broadcast content segments are converted to the second encoding format based on the broadcast profile.

18. The method according to claim 16, wherein the second encoding format includes a format that is outputted from an analog interface, a modified resolution of the broadcast content segments, a cropped version of the broadcast content segments, or associated with a location of an entity that distributes broadcast content.

19. A non-transitory computer-readable medium having stored thereon, computer executable instruction that when executed by a processor in a computer, causes the computer to execute operations, the operations comprising:

generating a new version of a disparate live media output stream manifest based on insertion of a plurality of segments of at least one of a pre-encoded media asset or a live input stream into the disparate live media output stream manifest, wherein each segment of the plurality of segments corresponds to a different quality level and a different content encryption mode, and wherein the plurality of segments corresponds to broadcast content segments encoded in a first encoding format of the new version of the disparate live media output stream manifest;

converting the broadcast content segments encoded in the first encoding format to a second encoding format in accordance with a broadcasting protocol;

re-writing the disparate live media output stream manifest to remove a digital right management (DRM) key reference; and serving as a proxy to deliver the rewritten disparate live media output stream manifest and decrypted broadcast content segments to a consumer device.

* * * * *